United States Patent
Liu et al.

(10) Patent No.: US 9,477,011 B2
(45) Date of Patent: Oct. 25, 2016

(54) MULTILAYER OPTICAL FILM

(76) Inventors: Yufeng Liu, Woodbury, MN (US);
David T. Yust, Woodbury, MN (US);
Stephen A. Johnson, Woodbury, MN (US)

(*) Notice: Subject to any disclaimer, the term of this patent is extended or adjusted under 35 U.S.C. 154(b) by 220 days.

(21) Appl. No.: 13/638,269

(22) PCT Filed: Jun. 22, 2011

(86) PCT No.: PCT/US2011/041394
§ 371 (c)(1),
(2), (4) Date: Sep. 28, 2012

(87) PCT Pub. No.: WO2012/003123
PCT Pub. Date: Jan. 5, 2012

(65) Prior Publication Data
US 2013/0101816 A1    Apr. 25, 2013

Related U.S. Application Data

(60) Provisional application No. 61/360,307, filed on Jun. 30, 2010, provisional application No. 61/427,230, filed on Dec. 27, 2010.

(51) Int. Cl.
| | | |
|---|---|---|
| G02B 1/04 | (2006.01) |
| B32B 7/02 | (2006.01) |
| B32B 27/08 | (2006.01) |
| B32B 27/36 | (2006.01) |
| G02B 5/08 | (2006.01) |
| G02B 5/30 | (2006.01) |

(52) U.S. Cl.
CPC . *G02B 1/04* (2013.01); *B32B 7/02* (2013.01); *B32B 27/08* (2013.01); *B32B 27/36* (2013.01); *G02B 5/0841* (2013.01); *G02B 5/305* (2013.01); *B32B 2250/42* (2013.01); *B32B 2307/418* (2013.01); *B32B 2457/202* (2013.01); *B32B 2551/00* (2013.01); *Y10T 428/24942* (2015.01)

(58) Field of Classification Search
CPC .......................... G02B 1/04; B32B 2307/418
See application file for complete search history.

(56) References Cited

U.S. PATENT DOCUMENTS

| | | |
|---|---|---|
| 4,525,413 A | 6/1985 | Rogers |
| 5,795,528 A | 8/1998 | Klein |
| 5,825,543 A | 10/1998 | Ouderkirk |
| 5,867,316 A | 2/1999 | Carlson |
| 5,882,774 A | 3/1999 | Jonza |

(Continued)

FOREIGN PATENT DOCUMENTS

| | | |
|---|---|---|
| DE | 100 43 785 | 3/2002 |
| FR | 2908523 | 5/2008 |

(Continued)

OTHER PUBLICATIONS

JP2011118190A_translation, Jun. 16, 2011.*

(Continued)

*Primary Examiner* — Aaron Austin
*Assistant Examiner* — Jasper Saberi

(57) ABSTRACT

Multilayer optical film that can be used as a reflective polarizer or mirror is disclosed. The multilayer optical film comprises alternating optical layers of polyesters such as PET and PEN, copolymerized with 4,4'-biphenyl dicarboxylate. The multilayer optical film exhibits a high ratio of in-plane to out-of-plane birefringence.

10 Claims, 6 Drawing Sheets

(56) References Cited

U.S. PATENT DOCUMENTS

| | | | |
|---|---|---|---|
| 5,919,536 A * | 7/1999 | Bennett et al. | 428/35.5 |
| 6,203,921 B1 | 3/2001 | Carter | |
| 6,307,676 B1 | 10/2001 | Merrill | |
| 6,352,761 B1 | 3/2002 | Hebrink | |
| 6,368,699 B1 | 4/2002 | Gilbert | |
| 6,569,515 B2 | 5/2003 | Hebrink | |
| 6,641,900 B2 | 11/2003 | Hebrink | |
| 6,783,349 B2 | 8/2004 | Neavin | |
| 6,808,658 B2 | 10/2004 | Stover | |
| 6,827,886 B2 | 12/2004 | Neavin | |
| 6,830,713 B2 | 12/2004 | Hebrink | |
| 6,888,677 B2 | 5/2005 | Condo | |
| 6,927,900 B2 | 8/2005 | Liu | |
| 6,939,499 B2 | 9/2005 | Merrill | |
| 7,052,762 B2 | 5/2006 | Hebrink | |
| 7,604,381 B2 | 10/2009 | Hebrink | |
| 8,012,571 B2 | 9/2011 | Liu | |
| 2001/0013668 A1 | 8/2001 | Neavin | |
| 2002/0190406 A1 | 12/2002 | Merrill | |
| 2004/0056994 A1 | 3/2004 | Honda | |
| 2006/0084780 A1 | 4/2006 | Hebrink | |
| 2006/0226561 A1 | 10/2006 | Merrill | |
| 2006/0246306 A1 | 11/2006 | Kliesch | |
| 2006/0272766 A1 | 12/2006 | Hebrink | |
| 2007/0177272 A1 | 8/2007 | Benson | |
| 2007/0298271 A1 * | 12/2007 | Liu et al. | 428/480 |
| 2008/0013051 A1 | 1/2008 | Glinski | |
| 2008/0268219 A1 * | 10/2008 | Hebrink et al. | 428/213 |
| 2011/0064930 A1 * | 3/2011 | Hirayama et al. | 428/220 |

FOREIGN PATENT DOCUMENTS

| | | |
|---|---|---|
| JP | H05-222175 | 8/1993 |
| JP | 2007-176154 | 7/2007 |
| JP | 2011-118190 | 6/2011 |
| JP | 2011118190 A * | 6/2011 |
| WO | WO 90/07553 | 7/1990 |
| WO | WO 90/10027 | 9/1990 |
| WO | WO 94/13480 | 6/1994 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01440 | 1/1997 |
| WO | WO 99/36248 | 7/1999 |
| WO | WO 99/36262 | 7/1999 |
| WO | WO 2007/149955 | 12/2007 |
| WO | WO 2008/144656 | 11/2008 |
| WO | WO 2009/069444 | 6/2009 |
| WO | WO 2009069444 A1 * | 6/2009 |
| WO | WO 2009/134595 | 11/2009 |
| WO | WO 2012/003123 | 1/2012 |
| WO | WO 2012/005879 | 1/2012 |

OTHER PUBLICATIONS

Huang et al., Using Surface Active Random Copolymers to Control the Domain Orientation in Diblock Copolymer Thin Films, *Macromolecules* 1998, 31, 7461-7450.

Ma et al., Crystal Structure and Composition of Poly(ethylene terephthalate-co-4, 4'-bibenzoate), *Macromolecules* 2004, 37, 7643-7648.

Ma et al., "Fiber Spinning, Structure, and Properties of Poly(ethylene terephthalate-co-4, 4'-bibenzoate) Copolyesters", *Macromolecules* 2002, 35, 5123-5130.

Carr et al., "Mesophase Structures in Poly(ethylene terephthalate), Poly(ethylene naphthalate) and poly(ethylene naphthalate bibenzoate)", *Polymers for Advanced Technologies*, vol. 8, pp. 592-600.

Polyakova et al., "Oxygen-Barrier Properties of Copolymers Based on Ethylene Terephthalate", Journal of Polymer Science, Part B: Physics, vol. 39, 2001, 1889-1899.

Liu et al., "Oxygen-Barrier Properties of Cold-Drawn Polyesters", *Journal of Polymer Science Part B-Polymer Physics* 2002, vol. 40, 862-877.

Hodge, et al., "Solid-State Structure of Thermally Crystallized Syndiotactic Polystyrene", Journal of Applied Polymer Science, vol. 83, 2705-2715 (2002).

Greis et al., "Morphology and Structure of Syndiotactic Polystyrene", Journal of Polymer, vol. 30, 590-594, (1989).

Guerra et al., "Polymorphism in Melt Crystallized Syndiotactic Polystyrene Samples" American Chemical Society, Macromolecules, vol. 23, No. 5, 1990, pp. 1539-1544.

International Search Report PCT/US2011/041394 Oct. 10, 2011, 4 pgs.

M.E. Denker et al. in Society for Information Display 45.1 (2006).

* cited by examiner

MULTILAYER OPTICAL FILM

CROSS REFERENCE TO RELATED APPLICATION

This application claims the benefit of U.S. Provisional Patent Application No. 61/360,307, filed Jun. 30, 2010 and claims the benefit of U.S. Provisional Patent Application No. 61/427,230, filed Dec. 27, 2010, the disclosures of which are incorporated by reference herein in their entirety.

FIELD

This disclosure relates to multilayer optical films which can be used as reflective polarizers or mirrors.

BACKGROUND

Multilayer optical films are used in a wide variety of applications. One particular use of multilayer optical films is in mirrors and polarizers that reflect light of a given polarization and wavelength range. Such reflective films are used, for example, in conjunction with backlights in liquid crystal displays to enhance brightness and reduce glare, and in articles, such as sunglasses, to reduce light intensity and glare.

One type of polymer that is useful in making multilayer optical films is a polyester. One example of a polyester-based multilayer optical film includes a stack of polyester layers of differing composition. One configuration of this optical stack includes a first set of birefringent layers and a second set of isotropic layers stacked with the layers in an alternating configuration such that multiple interfaces for reflecting light are formed. The multilayer optical film may also include one or more non-optical layers which, for example, cover at least one surface of the optical stack to prevent damage to the stack during or after processing. Other configurations of layers are also known.

SUMMARY

A multilayer optical film is disclosed. In one aspect, the multilayer optical film comprises: alternating first and second optical layers, the first optical layer comprising a first polyester derived from first carboxylate monomers and first diol monomers, the first carboxylate monomers comprising from about 5 to about 50 mol % of 4,4'-biphenyl dicarboxylate, wherein the first and second optical layers have refractive indices along at least one axis that differ by at least 0.04. In some embodiments, the second optical layer comprises a second polyester.

In another aspect, the multilayer optical film comprises: alternating first and second optical layers, the first optical layer comprising a first polyester derived from first carboxylate monomers and first diol monomers, the first carboxylate monomers comprising from about 20 to about 50 mol % of 4,4'-biphenyl dicarboxylate and from about 0.1 to about 5 mol % of a dicarboxylate monomer having pendant ionic groups, wherein the first and second optical layers have refractive indices along at least one axis that differ by at least 0.04. In some embodiments, the second optical layer comprises a second polyester.

These and other aspects of the invention are described in the detailed description below. In no event should the above summary be construed as a limitation on the claimed subject matter which is defined solely by the claims as set forth herein.

BRIEF DESCRIPTION OF DRAWINGS

Advantages and features of the invention may be more completely understood by consideration of the following figures in connection with the detailed description provided below.

DETAILED DESCRIPTION

Figure 1:
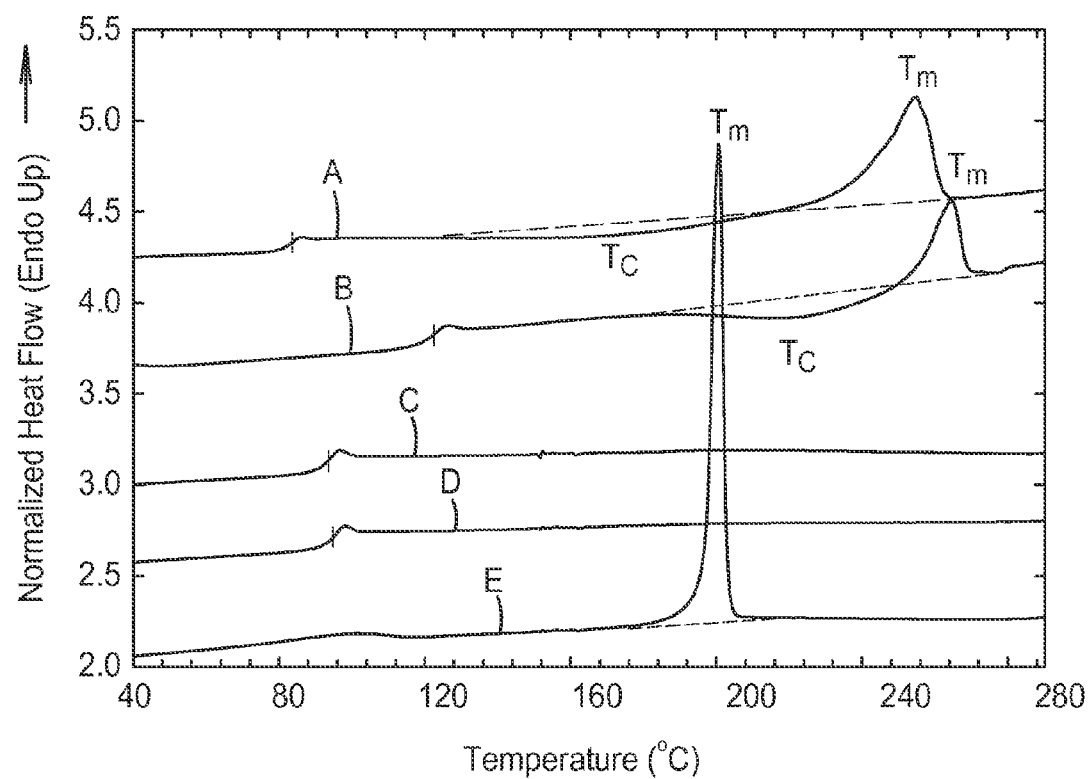
FIG. 1 shows thermograms obtained for PET, PEN and PETBB35.

PET and PEN are polyesters commonly used to make oriented films. For some applications in which multilayer optical films are used, however, PET is not suitable because birefringence developed upon orientation is too low. PEN can also be unsuitable because it tends to color and degrade over time due to absorption of UV radiation. Additionally, PEN has a melting point which makes it difficult to process, and there are limitations on the thickness of PEN layers that can be obtained given typical casting conditions.

Surprisingly, it has been found that a new class of polyester resins based on PET and/or PEN with bibenzoate or biphenyl dicarboxylate, referred to herein as "BB monomer", can be used to make multilayer optical films having high optical power that is greater than PET and close to that of PEN. This high optical power is due to large birefringence between first polyester layers comprising BB monomer and alternating second optical layers that do not comprise BB monomer. It has also been found that the use of alternating polyester layers with BB monomer reduces the off-axis color problem as compared to films made without BB monomer. Incorporation of BB monomer enables a single-packet reflective polarizer with thinner film constructions after constrained uniaxial stretching, as compared to films which do not have BB monomer.

The multilayer optical film comprises: alternating first and second optical layers, the first optical layer comprising a first polyester derived from first carboxylate monomers and first diol monomers, the first carboxylate monomers comprising from about 5 to about 50 mol % of 4,4'-biphenyl dicarboxylate, wherein the first and second optical layers have refractive indices along at least one axis that differ by at least 0.04. In some embodiments, 4,4'-biphenyl dicarboxylate is present in an amount of from about 20 to about 45 mol %, and the first carboxylate monomers further comprise terephthalate. The first carboxylate monomers can consist essentially of 4,4'-biphenyl dicarboxylate and terephthalate.

In some embodiments, the first carboxylate monomers further comprise a dicarboxylate monomer having pendant ionic groups. The pendant ionic groups can be present in an amount of less than about 5 mol %, for example, from about 0.1 to about 5 mol %, relative to the total moles of first carboxylate monomers. For example, the first dicarboxylate monomers can further comprise terephthalate and dimethyl sulfoisophthalate, or the first dicarboxylate monomers can consist essentially of 4,4'-biphenyl dicarboxylate, terephthalate, and dimethyl sulfoisophthalate.

In some embodiments, 4,4'-biphenyl dicarboxylate is present in an amount of from about 4 to about 37 mol %, and the first carboxylate monomers further comprise terephthalate and naphthalene dicarboxylate. The first dicarboxylate monomers can consist essentially of 4,4'-biphenyl dicarboxylate, terephthalate and naphthalene dicarboxylate. In some embodiments, 4,4'-biphenyl dicarboxylate is present in an amount of from about 5 to about 25 mol %, and the first carboxylate monomers further comprise napthalene dicarboxylate. The first carboxylate monomers can consist essentially of 4,4'-biphenyl dicarboxylate and napthalene dicarboxylate.

In some embodiments, the multilayer optical film comprises: alternating first and second optical layers, the first optical layer comprising a first polyester derived from first carboxylate monomers and first diol monomers, the first carboxylate monomers comprising from about 20 to about 50 mol % of 4,4'-biphenyl dicarboxylate and from about 0.1 to about 5 mol % of a dicarboxylate monomer having pendant ionic groups, wherein the first and second optical layers have refractive indices along at least one axis that differ by at least 0.04.

For the multilayer optical film disclosed herein, embodiments include: $\Delta n_{xy}$ is at least about 0.18; the ratio of $\Delta n_{xy}$ over $\Delta n_{yz}$ is at least about 3; the ratio of $\Delta n_{xy}$ over $\Delta n_{yz}$ is at least about 8; and/or the ratio of $\Delta n_{xy}$ over $\Delta n_{yz}$ is at least about 15.

Surprisingly, films made with BB monomer can be clearer and more transparent upon cooling compared to PET and PEN films which can become opaque upon cooling. Another advantage is that films made with BB monomer tend to have a larger stretching window (larger range of draw ratios that can be used) compared to films made without BB monomer such as PET and PEN films. It has also been found that films made with BB monomer do not have problems associated with PEN, for example, they degrade less because they absorb less red-shifted UV radiation, and they can be processed at lower temperatures.

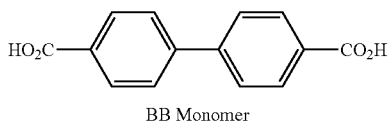 [SMILES: O=C(O)c1ccc(-c2ccc(C(=O)O)cc2)cc1]

BB Monomer

Surprisingly, the polyester resins comprising BB monomer can exhibit unique thermal behavior, as evidence by differential scanning calorimetry (DSC). For example, FIG. 1 shows thermograms obtained for films of quenched PET, PEN and PETBB35 (polyester made from 65 mol % terephthalate and 35 mol % BB monomer as dicarboxylates with 100 mol % ethylene glycol as diol) as well as PETBB35 stretched at 105° C. and rate 50%/sec. The DSC scans are conducted in $N_2$ with a Perkin-Elmer DSC 7 at 20° C./min heating rate. Stretched PETBB35 exhibits an extremely sharp melting peak (ZD) scan around 200° C. with a peak width at half height (PWHH) of 3° C. (trace E). The sharpness of the ZD for stretched PETBB35 film is indicative of liquid crystallinity generated by a highly ordered structure from the stretching process. Stretched PETBB35 that has been melted (trace C), however, does not exhibit any order (Tc and ZD are absent), suggesting PETBB35 is easily quenchable from the melt without forming significant order. Non-stretched, melt quenched PETBB35 (trace D) exhibits the same behavior. For reference non stretched, melt quenched PET (trace A) and PEN (trace B) exhibit crystallization (Tc) and subsequent melting (ZD).

Table 1 shows data obtained from DSC for PETBB35. By replacing terephthalate units with BB monomer, the Tg increases from 79° C. for PET to 96° C. for PETBB35. The melting point is suppressed significantly from 255° C. for PET and 265° C. for PEN to 198° C. for PETBB35.

TABLE 1

| Transition Temperature | PETBB35 | PEN | PET |
|---|---|---|---|
| Tg (° C.) | 96 | 125 | 79 |
| ZD (° C.) | 198 | 265 | 255 |

Surprisingly, the polyester resins comprising BB monomer can exhibit unique crystalline behavior. For example, PETBB35 remains clear (or transparent) when slowly cooled to ambient temperature, whereas PET and PEN crystallize to form whitened opaque films. The transparent appearance of PETBB35 solid is typical of PETBB resins disclosed herein, which are believed to crystallize into highly defective nanocrystals during slow cooling which do not scatter light as compared to micron-scale spherulites of PET and PEN. Thus, PETBB resins can be used to form clear (or transparent) films with slow quenching, and the films can have high birefringence due to liquid crystalline structure formation during stretching (and heat set as described below). This unique behavior suggests a general class of birefringent materials which crystallize without stretching into crystallites less than a specific dimension (e.g. <100 nm) below which the crystallites do not scatter light. These BB monomer-based resins can be particularly useful in making thick transparent multilayer cast webs that are subsequently stretched.

Refractive indices of films made with BB monomer can be varied with stretching conditions. For example, PETBB35 film was stretched using a lab scale batch stretcher. Films of uniaxial orientation without constraint on the edge (or true uniaxial orientation) were prepared. The stretching temperature was 105° C. and stretching rate was 30%/sec with draw ratio from 5.0 to 6.0. The film remains clear (or transparent) after stretching. The refractive index was measured in machine direction (MD), transverse direction (TD), and thickness direction (ZD). The results are summarized in Table 2.

The refractive index of unoriented films are included in Table 2 for comparison. Even though PETBB35 film has an intermediate RI in amorphous state (1.60), the birefringence developed during stretching is close to that of PEN (0.28) and it is significantly higher than PET (0.16). The unexpected large birefringence of PETBB35 developed during stretching is typical of PETBB resins and is presumably due to the formation liquid crystalline structure upon stretching. The birefringence development of PETBB can be adjusted to match the specific application by adjusting the BB monomer loading or degree of drawing. For example, the birefringence of PETBB35 can be further increased by increasing BB monomer loading in the polymer from 35 mol % to 45 mol %. Additional Examples are described below for Example Set A with data summarized in Table 5.

TABLE 2

| Stretching | PETBB35 | PEN | PET |
|---|---|---|---|
| Amorphous Resin | 1.60 | 1.64 | 1.57 |
| Uniaxially Stretched (MD/TD/ZD) | 1.797/1.546/1.532 ($\Delta n = 0.26$) | 1.84/1.56/1.56 ($\Delta n = 0.28$) | 1.69/1.53/1.53 ($\Delta n = 0.16$) |
| Draw Ratio = 5.0 | | | |

$\Delta n = n(MD) - [n(TD) + n(ZD)]/2$

Figure 2A:
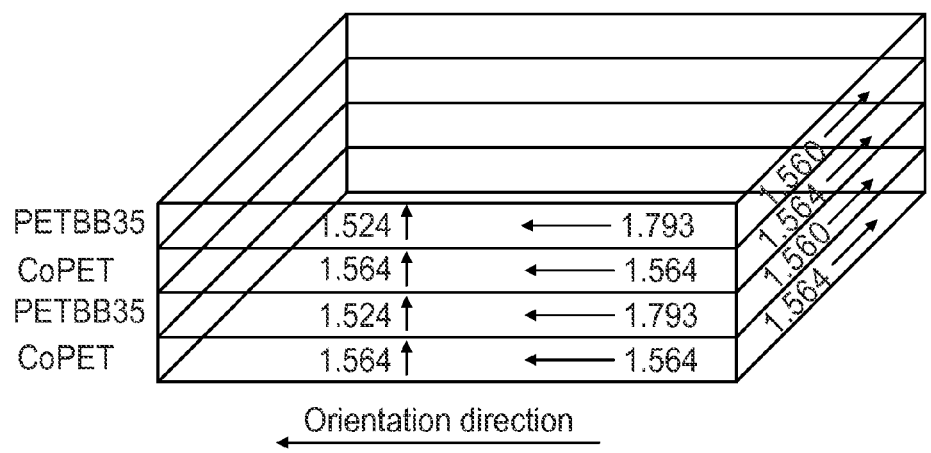
FIG. 2a is a schematic perspective view of an exemplary reflective polarizer made with alternating layers of PETBB35 and coPET.

FIG. 2a is a schematic perspective view of an exemplary reflective polarizer made with alternating layers of PETBB35 and coPET (polyester not comprising BB monomer) such as EASTAR 6763 (from EasZDan Chemical). The refractive index difference in the machine direction gives a birefringence of 0.23, and the refractive index mismatch in the thickness direction gives a refractive index mismatch of 0.040. There is little difference between refractive indices in the transverse direction. This exemplary reflective polarizer has advantages of: (1) high optical power between layers, 2) less off-axis index mismatch for color generation at high angles, and 3) easy processing because both materials flow readily at reasonably low temperatures and quench easily to an essentially amorphous state.

The optical appearance and birefringence of stretched PETBB films are summarized in Table 3. PET and poly(ethylene bibenzoate) (PEBB) are included for comparison.

TABLE 3

| Polyester | Optical Appearance After Quenching | Optical Appearance After Stretching |
|---|---|---|
| PET | clear | clear |
| PETBB10 | clear | clear |
| PETBB25 | clear | clear |
| PETBB35 | clear | clear |
| PETBB45 | clear | clear |
| PETBB55 | clear | hazy |
| PETBB60 | cloudy | opaque |
| PEBB | opaque | opaque |

Figure 2B:
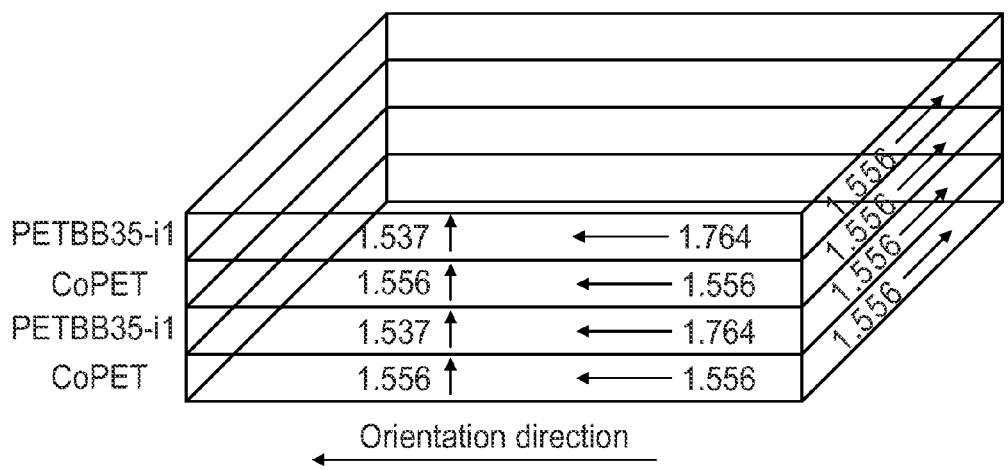
FIG. 2b is a schematic perspective view of an exemplary reflective polarizer made with alternating layers of PETBB35-i1 and coPET.

FIG. 2b is a schematic perspective view of an exemplary reflective polarizer made with alternating layers of coPET and PETBB35-i1 (polyester made from 64 mol % terephthalate, 35 mol % BB monomer and 1 mol % sulfoisophthalate as dicarboxylates with 100 mol % ethylene glycol as diol). The refractive index difference in the machine direction gives a birefringence of 0.21, and the refractive index mismatch in the thickness direction gives a refractive index mismatch of 0.019. There is little or no difference between refractive indices in the transverse direction. This exemplary reflective polarizer has advantages as described for PETBB35 with the off-axis index mismatch being further reduced. Additional Examples are described below for Example Set B with data summarized in Tables 6 and 7.

Surprisingly, PENBB polyester films were found to have unique thermal properties and exhibit unique crystalline behavior. Table 4 summarizes thermal data for PENBB resins, indicating that 10-30 mol % of BB monomer can facilitate melt processing and create a more robust multilayer optical film that is low melting (as low as 230° C.) with hindered crystallization ($\Delta Hm$ as low as about 0 J/g) and high Tg (120° C.). Additional Examples are described below for Example Set D with data summarized in Tables 10 and 11.

TABLE 4

| Polyester | Tg (° C.) | ZD (° C.)[2] | $\Delta Hm$ (J/g)[3] | Optical Appearance After Stretching |
|---|---|---|---|---|
| PEN | 122 | 268 | 50 | clear |
| PENBB5 | 121 | 257 | 35 | clear |
| PENBB10 | 120 | 249 | 20 | clear |
| PENBB15 | 120 | 243 | 9 | clear |
| PENBB20 | 121 | 235 | 2 | clear |
| PENBB25 | 120 | 230 | 25 | clear |
| PENBB35 | 122 | 252 | 30 | hazy |

Figure 2C:
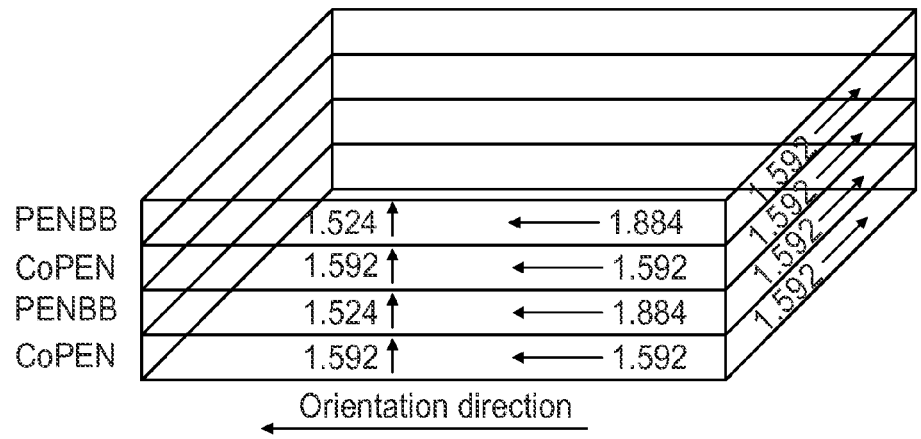
FIG. 2c is a schematic perspective view of an exemplary reflective polarizer made with alternating layers of PENBB15 and CoPEN.

FIG. 2c is a schematic perspective view of an exemplary reflective polarizer made with alternating layers of a low index optical layer such as CoPEN and PENBB15 (polyester made from 85 mol % naphthalene dicarboxylic acid, 15 mol % BB monomer as dicarboxylates with 100 mol % ethylene glycol as diol). The refractive index difference in the machine direction gives a birefringence of 0.29, and the refractive index mismatch in the thickness direction gives a refractive index mismatch of 0.068. There is little or no difference between refractive indices in the transverse direction. This exemplary reflective polarizer has advantages of: (1) high optical power between layers, 2) less off-axis index mismatch for color generation at high angles, and 3) easy processing because both materials flow readily at reasonably low temperatures and quench easily to an essentially amorphous state.

Figure 2D:
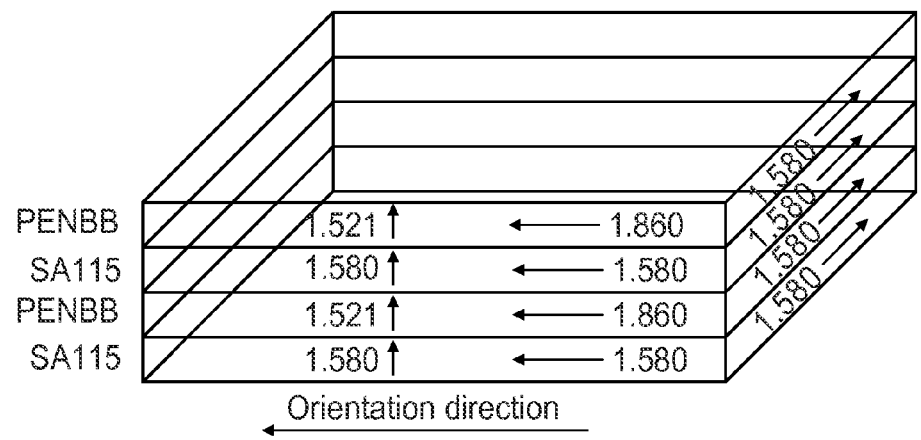
FIG. 2d is a schematic perspective view of an exemplary reflective polarizer made with alternating layers of PET13N71BB16 and SA115.
Figure 3:
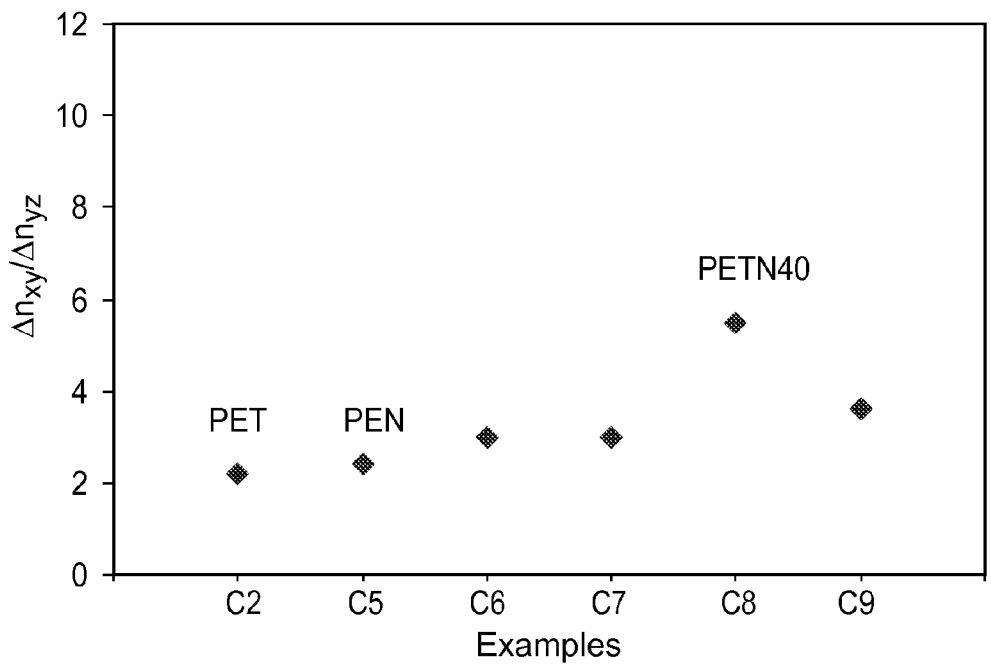
FIG. 3 is a plot showing $\Delta n_{xy}/\Delta n_{yz}$ for optical articles comprising copolyesters of PET with PEN. Data for this plot are provided in Table 5.
Figure 4:
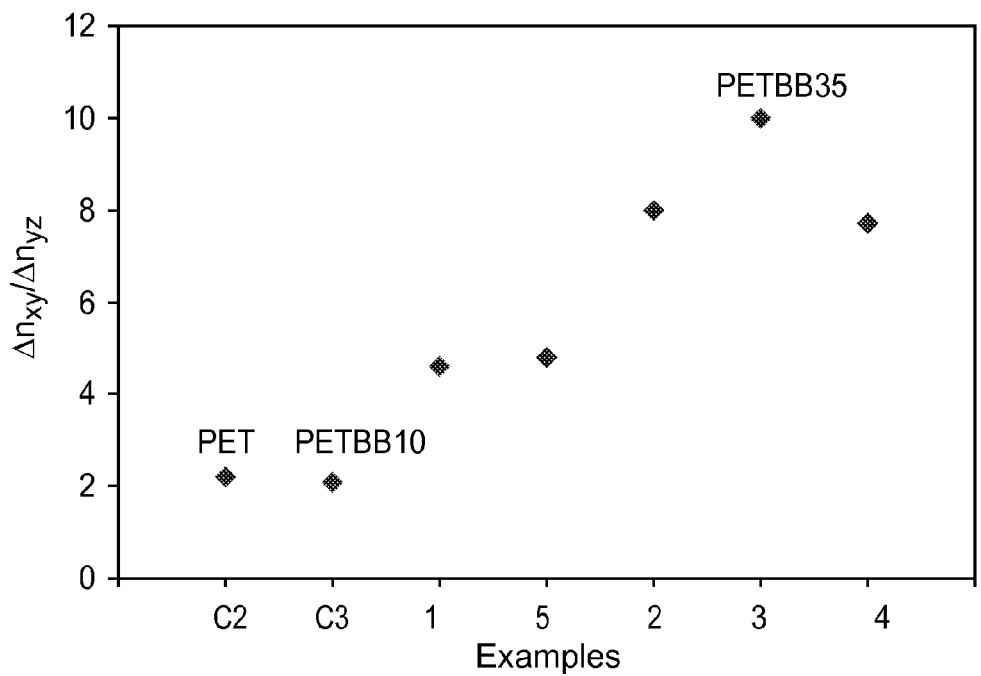
FIG. 4 is a plot showing $\Delta n_{xy}/\Delta n_{yz}$ for optical articles comprising copolyesters of PET with 4,4'-biphenyl dicarboxylate monomer (BB monomer). Data for this plot are provided in Table 5.
Figure 5:
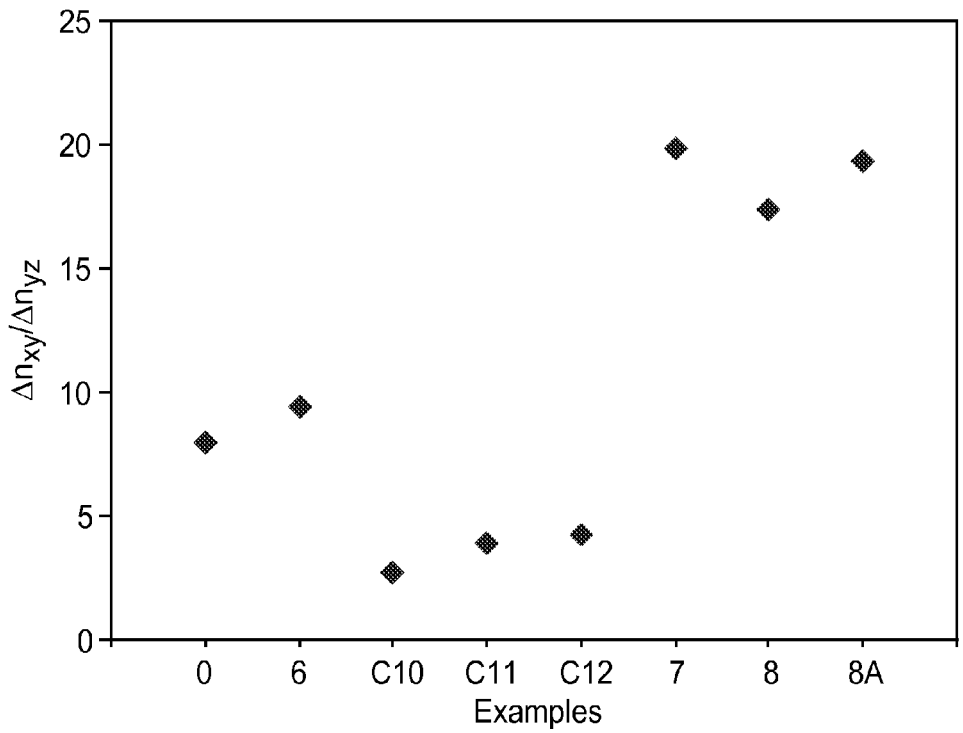
FIG. 5 is a plot showing $\Delta n_{xy}/\Delta n_{yz}$ for optical articles comprising copolyesters of PET and PEN with BB monomer and monomers having pendant ionic groups. Data for this plot are provided in Tables 6 and 7.
Figure 6:
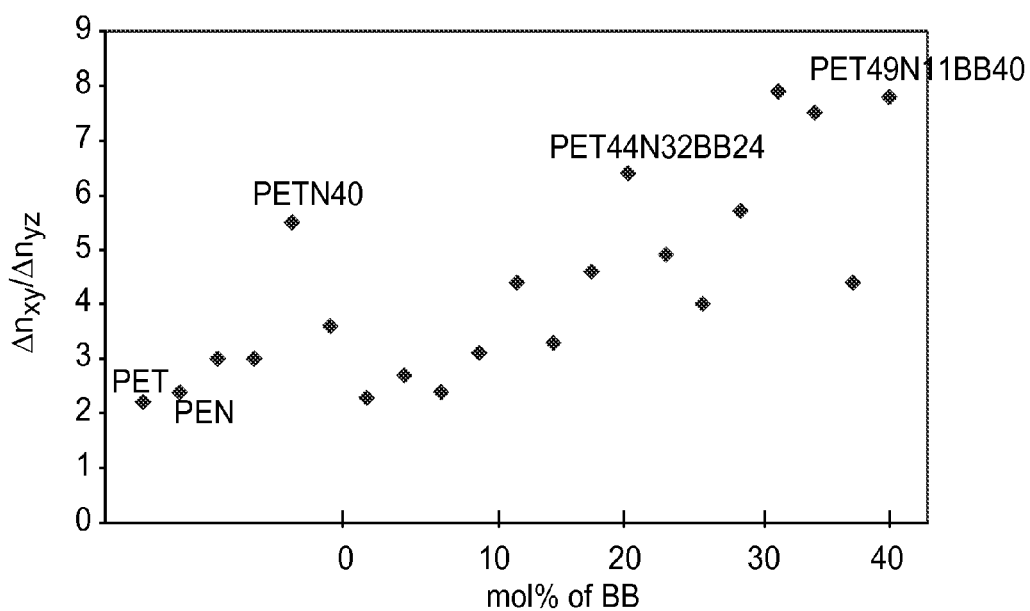
FIG. 6 is a plot showing $\Delta n_{xy}/\Delta n_{yz}$ for optical articles comprising copolyesters of PET and PEN with BB monomer. Data for this plot are provided in Tables 5 and 9.
Figure 7:
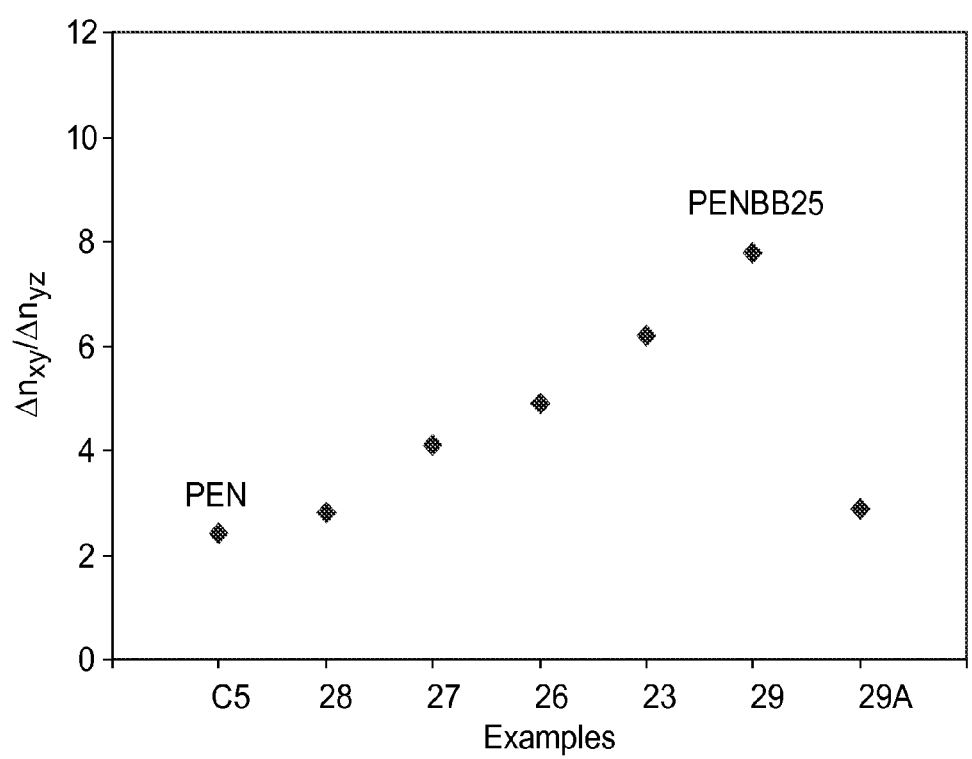
FIG. 7 is a plot showing $\Delta n_{xy}/\Delta n_{yz}$ for optical articles comprising copolyesters of PEN with BB monomer. Data for this plot are provided in Table 10.

Surprisingly, PETNBB polyester films were found to have unique thermal properties and exhibit unique crystalline behavior. Examples are described below for Example Set C with data summarized in Tables 8 and 9. FIG. 2d is a schematic perspective view of an exemplary reflective polarizer made with alternating layers of a low index optical layer such as SA115 (polycarbonate/copolyester blend from Eastman Chemical) and PET13N71BB16 (polyester made from 13 mol % terephthalate, 71 mol % naphthalene dicarboxylic acid and 16 mol % BB monomer as dicarboxylates with 100 mol % ethylene glycol as diol). The refractive index difference in the machine direction gives a birefringence of 0.28, and the refractive index mismatch in the thickness direction gives a refractive index mismatch of 0.059. There is little or no difference between refractive indices in the transverse direction. This exemplary reflective polarizer has advantages of: (1) high optical power between layers, 2) less off-axis index mismatch for color generation at high angles, and 3) easy processing because both materials flow readily at reasonably low temperatures and quench easily to an essentially amorphous state.

The present invention relates to multilayer optical films, particularly those comprising alternating layers of first and second optical layers. In general, the first and second optical layers have different refractive index characteristics so that some light is reflected at interfaces between adjacent layers. The layers are sufficiently thin so that light reflected at a plurality of the interfaces undergoes constructive or destructive interference in order to give the film the desired reflective or transmissive properties. For multilayer optical films designed to reflect light at ultraviolet, visible, or near-infrared wavelengths, each layer generally has an optical thickness (i.e., a physical thickness multiplied by refractive index) of less than about 1 μm. Thus, in one embodiment, the first and second optical layers each have a thickness of less than about 1 um. Thicker layers can, however, also be included, such as skin layers on the outer surfaces of the film, or protective boundary layers disposed within the film that separate packets of optical layers. Exemplary multilayer optical films which include one or more layers on the outer surfaces are known. The multilayer optical film disclosed herein may comprise anywhere from 2 to about 5000 optical layers, preferably from 3 to 1000 optical layers, and more preferably from 3 to 700 optical layers. In one embodiment, the multilayer optical film disclosed herein comprises from 50 to 700 optical layers.

The multilayer optical film disclosed herein may comprise a polarizer film, a reflective polarizer film, a diffuse blend reflective polarizer film, a diffuser film, a brightness enhancing film, a turning film, a mirror film, or a combination thereof. Multilayer optical films are described, for example, in U.S. Pat. No. 6,352,761 B1 (Hebrink et al.); U.S. Pat. No. 7,052,762 B2 (Hebrink et al.); U.S. Pat. No. 6,641,900 B2 (Hebrink et al.); U.S. Pat. No. 6,569,515 B2 (Hebrink et al.); and US 2006/0226561 A1 (Merrill et al.); all of which are incorporated herein by reference for all that they contain.

The multilayer optical film disclosed herein comprises alternating layers of first optical layers made from a first polyester, and second optical layers made from one or more polymers. In some embodiments, the second optical layer comprises a second polyester. As used herein, the term polyester refers to polyesters made from a single dicarboxylate monomer and a single diol monomer and also to copolyesters which are made from more than one dicarboxylate monomer and/or more than one diol monomer. In general, polyesters are prepared by condensation of the carboxylate groups of the dicarboxylate monomer with hydroxyl groups of the diol monomer.

The first polyester comprises first dicarboxylate monomers, and the first dicarboxylate monomers comprise 4,4'-biphenyl dicarboxylate. The first dicarboxylate monomers may comprise terephthalate and 4,4'-biphenyl dicarboxylate. For example, when the first dicarboxylate monomers comprise terephthalate and 4,4'-biphenyl dicarboxylate, the 4,4'-biphenyl dicarboxylate monomer may be present in an amount between 10 mol % and 55 mol % on a dicarboxylates basis. For example, when the first dicarboxylate monomers comprise terephthalate and 4,4'-biphenyl dicarboxylate, the 4,4'-biphenyl dicarboxylate monomer may be present in an amount between 15 mol % and 50 mol % on a dicarboxylates basis. For example, when the first dicarboxylate monomers comprise terephthalate and 4,4'-biphenyl dicarboxylate, the 4,4'-biphenyl dicarboxylate monomer may be present in an amount between 20 mol % and 45 mol % on a dicarboxylates basis.

The first dicarboxylate monomers may comprise naphthalate and 4,4'-biphenyl dicarboxylate. For example, when the first dicarboxylate monomers comprise naphthalate and 4,4'-biphenyl dicarboxylate, the 4,4'-biphenyl dicarboxylate monomer may be present in an amount between 1 mol % and 35 mol % on a dicarboxylates basis. For example, when the first dicarboxylate monomers comprise naphthalate and 4,4'-biphenyl dicarboxylate, the 4,4'-biphenyl dicarboxylate monomer may be present in an amount between 1 mol % and 30 mol % on a dicarboxylates basis. For example, when the first dicarboxylate monomers comprise naphthalate and 4,4'-biphenyl dicarboxylate, the 4,4'-biphenyl dicarboxylate monomer may be present in an amount between 5 mol % and 25 mol % on a dicarboxylates basis.

The first dicarboxylate monomers may comprise terephthalate, naphthalate, and 4,4'-biphenyl dicarboxylate. For example, when the first dicarboxylate monomers comprise terephthalate, naphthalate, and 4,4'-biphenyl dicarboxylate, the naphthalate monomer may be present in an amount between 1 and 99 mol %, and the 4,4'-biphenyl dicarboxylate monomer may be present in an amount between 1 mol % and 45 mol % on a dicarboxylates basis. For example, when the first dicarboxylate monomers comprise terephthalate, naphthalate, and 4,4'-biphenyl dicarboxylate, the terephthalate monomer may be present in an amount between 5 and 58 mol %, the naphthalate monomer may be present in an amount between 11 and 91 mol %, and the 4,4'-biphenyl dicarboxylate monomer may be present in an amount between 2 mol % and 40 mol % on a dicarboxylates basis. For example, when the first dicarboxylate monomers comprise terephthalate, naphthalate, and 4,4'-biphenyl dicarboxylate, the terephthalate monomer may be present in an amount between 38 and 67 mol %, the naphthalate monomer may be present in an amount between 1 and 25 mol %, and the 4,4'-biphenyl dicarboxylate monomer may be present in an amount between 21 mol % and 45 mol % on a dicarboxylates basis.

The first dicarboxylate monomers may comprise 4,4'-biphenyl dicarboxylate and ionomeric dicarboxylate. For example, when the first dicarboxylate monomers comprise 4,4'-biphenyl dicarboxylate and an ionomeric dicarboxylate, the 4,4'-biphenyl dicarboxylate monomer may be present in an amount between 1 mol % and 45 mol %, and the ionomeric dicaroxylate may be present in an amount up to 5 mol % on a dicarboxylates basis. For example, when the first dicarboxylate monomers comprise 4,4'-biphenyl dicarboxylate and an ionomeric dicarboxylate, the 4,4'-biphenyl dicarboxylate monomer may be present in an amount between 1 mol % and 45 mol %, and the ionomeric dicaroxylate may be present in an amount from 0.1 to 5 mol % on a dicarboxylates basis. For example, when the first dicarboxylate monomers comprise 4,4'-biphenyl dicarboxylate and an ionomeric dicarboxylate, the 4,4'-biphenyl dicarboxylate monomer may be present in an amount between 1 mol % and 45 mol %, and the ionomeric dicaroxylate may be present in an amount from 0.1 to 2 mol % on a dicarboxylates basis.

The first dicarboxylate monomers may comprise terephthalate, 4,4'-biphenyl dicarboxylate and ionomeric dicarboxylate. For example, when the first dicarboxylate monomers comprise terephthalate, 4,4'-biphenyl dicarboxylate and an ionomeric dicarboxylate, the 4,4'-biphenyl dicarboxylate monomer may be present in an amount between 1 mol % and 45 mol %, and the ionomeric dicaroxylate may be present in an amount up to 5 mol % on a dicarboxylates basis. For example, when the first dicarboxylate monomers comprise terephthalate, 4,4'-biphenyl dicarboxylate and an ionomeric dicarboxylate, the 4,4'-biphenyl dicarboxylate monomer may be present in an amount between 1 mol % and 45 mol %, and the ionomeric dicaroxylate may be present in an amount from 0.1 to 5 mol % on a dicarboxylates basis. For example, when the first dicarboxylate monomers comprise terephthalate, 4,4'-biphenyl dicarboxylate and an ionomeric dicarboxylate, the 4,4'-biphenyl dicarboxylate monomer may be present in an amount between 1 mol % and 45 mol %, and the ionomeric dicaroxylate may be present in an amount from 0.1 to 2 mol % on a dicarboxylates basis.

When the first dicarboxylate monomers comprise an ionomeric dicarboxylate, the ionomeric dicarboxylate may comprise sodium sulfoisophthalate.

The first dicarboxylate monomers may comprise any dicarboxylate monomers known for preparing polyesters used in optical applications. As used herein, the terms "carboxylate" and "acid" are used interchangeably and include lower alkyl esters having from 1 to 10 carbon atoms. Examples of first dicarboxylate monomers include naphthalene dicarboxylic acid; terephthalate dicarboxylic acid; phthalate dicarboxylic acid; isophthalate dicarboxylic acid; (meth)acrylic acid; maleic acid; itaconic acid; azelaic acid; adipic acid; sebacic acid; norbornene dicarboxylic acid; bi-cyclooctane dicarboxylic acid; 1,6-cyclohexane dicarboxylic acid; t-butyl isophthalic acid; tri-mellitic acid; 4,4'-biphenyl dicarboxylic acid; or combinations thereof; and which may be substituted by its dimethyl ester form.

One or more of the first dicarboxylate monomers may have pendant ionic groups as described in US 2007/0298271 (Liu et al.). Pendant ionic groups are groups that do not participate in polymerization reactions which form the main backbone of the polyester. Although not wishing to be bound by theory, it is believed that interlayer adhesion increases as a result of the pendant ionic groups in one layer interacting with polar groups such as carbonyl oxygens in an adjacent layer; it is also possible that the pendant ionic groups in one layer interact with counterions present in an adjacent layer.

Any of the aforementioned dicarboxylic acid groups may be substituted with an ionic group in order to provide the pendant ionic groups. The pendant ionic groups may be introduced by grafting them onto side chains of a polyester, capping as end groups of a polyester, or including monomers having pendant ionic groups during polymerization to form the first polyester. The pendant ionic groups may be anionic or cationic. Examples of anionic groups include sulfonate, phosphonate, or carboxylate groups, or a combination thereof. Examples of cationic groups include ammonium and sulfonium groups. The first dicarboxylate monomer having the pendant ionic group may comprise one or more dicarboxylate monomers having the same or different pendant ionic groups. Each pendant ionic group is associated with a counterion which may be an inorganic or an organic counterion. Examples of inorganic counterions include sodium, potassium, lithium, zinc, magnesium, calcium, cobalt, iron, aluminum, or antimony counterions, or a combination thereof. Examples of organic counterions include C2-C20 compounds, especially carboxylates. Preferred organic counterions include citrates, malates, malonates, maleates, adipates, succinates, acetates, propionates, lactates, tartrates, glycolates and combinations thereof. A useful first dicarboxylate monomer with a pendant ionic group comprises a salt of 5-sulfoisophthalate such as sodium 5-sulfoisophthalate.

The first diol monomer may comprise one or more diol monomers, and they may be any of those used to make polyesters for optical applications. Useful diol monomers also include those having more than two hydroxyl groups, for example, triols, tetraols, and pentaols, may also be useful. In general, aliphatic diols and glycols are useful; examples include 1,6-hexanediol; 1,4-butanediol; trimethylolpropane; 1,4-cyclohexanedimethanol; 1,4-benzenedimethanol; neopentyl glycol; ethylene glycol; propylene glycol; polyethylene glycol; tricyclodecanediol; norbornane diol; bicyclo-octanediol; pentaerythritol; bisphenol A; and 1,3-bis(2-hydroxyethoxy)benzene.

In one embodiment, the first polyester may comprise derivatives of polyethylene naphthalate (PEN) which comprises naphthalene dicarboxylate and ethylene glycol. The derivatives are obtained by replacing naphthalene dicarboxylate with a salt of 5-sulfoisophthalate such that the total number of first dicarboxylate monomers is the same. In one particular example, the first polyester may comprise naphthalene dicarboxylate and a salt of 5-sulfoisophthalate; and the first diol monomers comprise ethylene glycol. For example, the first polyester may comprise 2 mol % of sodium 5-sulfoisophthalate and 98 mol % of naphthalene dicarboxylate to 100 mol % of ethylene glycol. For another example, the first polyester may comprise 5 mol % of sodium 5-sulfoisophthalate and 95 mol % of naphthalene dicarboxylate to 100 mol % of ethylene glycol.

The first optical layer may comprise additional components such as one or more catalysts and/or stabilizers. For example, the first optical layer may comprise acetates or oxides of metals selected from the group consisting of beryllium, sodium, magnesium, calcium, strontium, barium, boron, aluminum, gallium, manganese, cobalt, zinc, and antimony. For another example, the first optical layer may comprise one or more phosphorus compounds such as phosphoric acid or trimethyl phosphate. The first optical layer may comprise less than 0.5 wt %, or less than 0.1 wt %, of one or more catalysts and/or stabilizers. In particular, the first polyester may comprise about 0.5 wt % or less of a monovalent organic salt.

The multilayer optical film comprises second optical layers. The second optical layers are made from one or more polymers. In some embodiments, the second optical layers comprise a second polyester. The second polyester may have no pendant ionic groups. For example, the second dicarboxylate monomers may comprise naphthalene dicarboxylate; and the second diol monomers may comprise ethylene glycol. For another example, the second dicarboxylate monomers may comprise terephthate and the second diol monomers may comprise ethylene glycol and neopentyl glycol. For another example, the second dicarboxylate monomers may comprise naphthalene dicarboxylate and terephthalate; and the second diol monomers may comprise ethylene glycol. The second polyester may have pendant ionic groups, i.e., the second polyester may comprise second dicarboxylate monomers and second diol monomers, and from about 0.1 to less than 5 mol % of the second dicarboxylate monomers have pendant ionic groups. As described for the first optical layer, the second optical layer may comprise other polymers in addition to the second polyester, for example, anything extrudable with PET or PEN with the addition of optional low temperature extrudable materials such as acrylics (polymethylmethacrylate and copolymers thereof), silicones, polycarbonate alloys (such as SA115 described below), poly lactic acid, polyolefins, polyurethanes, ethylene vinyl acetates, polystyrene and styrene copolymers, fluoropolymers (THV commercially available from 3M™ Co.), polyamides, and polyimides. The second optical layer may also comprise additional components as described for the first optical layer.

Particular combinations of first and second optical layers are useful. For example, one useful combination of first and second optical layers is a first optical layer comprising a copolyester comprising 4,4'-biphenyl dicarboxylate and a second optical layer comprising PEN. For example, another useful combination of first and second optical layers is a first optical layer comprising a copolyester comprising 4,4'-biphenyl dicarboxylate and a second optical layer comprising a copolyester comprising naphthalate. For example, another useful combination of first and second optical layers is a first optical layer comprising a copolyester comprising 4,4'-biphenyl dicarboxylate and a second optical layer comprising a copolyester comprising terephthalate. For example, another useful combination of first and second optical layers is a first optical layer comprising a copolyester comprising 4,4'-biphenyl dicarboxylate and a second optical layer comprising a silicone thermoplastic. For example, another useful combination of first and second optical layers is a first optical layer comprising a copolyester comprising 4,4'-biphenyl dicarboxylate and a second optical layer comprising a thermoplastic fluoropolymer. For example, another useful combination of first and second optical layers is a first optical layer comprising a copolyester comprising 4,4'-biphenyl dicarboxylate and a second optical layer comprising an acrylate thermoplastic.

The multilayer optical film disclosed herein is suitable for use in optical applications in which light is managed, enhanced, manipulated, controlled, maintained, transmitted, reflected, refracted, absorbed, etc. For example, the optical article may be used in a graphic arts application, for example, backlit signs, billboards, and the like. The optical article may be used in a display device comprising, at the very least, a light source and a display panel. In this case, the optical article would typically have an area comparable to that of the display panel and would be positioned between the display panel and the light source. When the optical article is present in a display device, brightness at the display panel increases. The optical article may be used in display devices for other purposes, such as to diffuse light emitted by the light source, so that a viewer is less able to discern the shape, size, number, etc. of individual light sources, as compared to a display device in which the optical article is not used. The display panel may be of any type capable of producing images, graphics, text, etc., and may be mono- or polychromatic. Examples include a liquid crystal display panel, a plasma display panel, or a touch screen. The light source may comprise one light source or several individual light sources; examples include fluorescent lamps, phosphorescent lights, light emitting diodes, or combinations thereof. Examples of display devices include televisions, monitors, laptop computers, and handheld devices such as cell phones, PDA's, calculators, and the like.

The multilayer optical film disclosed herein may be formed by coextrusion of the polymers as described in any of the aforementioned references. Extrusion conditions are chosen to adequately feed, melt, mix, and pump the polymers as feed streams or melt streams in a continuous and stable manner. Temperatures used to form and maintain each of the melt streams are chosen to be within a range that reduces freezing, crystallization, or unduly high pressure drops at the low end of the range, and that reduces degradation at the high end. Preferably, the polymers of the various layers are chosen to have similar rheological properties (e.g., melt viscosities) so that they can be co-extruded without flow disturbances.

Each feed stream is conveyed through a neck tube into a gear pump used to regulate the continuous and uniform rate of polymer flow. A static mixing unit may be placed at the end of the neck tube to carry the melt streams from the gear pump into a feedblock with uniform melt stream temperature. The entire melt stream is typically heated as uniformly as possible to enhance both uniform flow of the melt stream and reduce degradation during melt processing.

If top and bottom layers comprise the same material, a multilayer feedblock may be used to divide the extrudable polymer into two melt streams, one for each of the top and bottom layers. The layers from any melt stream are created by sequentially bleeding off part of the stream from a main flow channel into side channel tubes which lead to layer slots in the feedblock manifold. The layer flow is often controlled by choices made in machinery, as well as the shape and physical dimensions of the individual side channel tubes and layer slots.

The downstream-side manifold of the feedblock is often shaped to compress and uniformly spread the layers of the combined multilayer stack transversely. The multilayer stack exiting the feedblock manifold may then enter a final shaping unit such as a single manifold die. The resulting web is then cast onto a chill roll, sometimes referred to as a casting wheel or casting drum. This casting is often assisted by the use of a nip roll. In general, the web is cast to a uniform thickness across the web but deliberate profiling of the web thickness may be induced by die lip controls. Alternatively, a multi-manifold extrusion die may be used to spread and combine the layers prior to casting.

After cooling, the multilayer web is drawn or stretched to produce the multilayer optical film; details related to drawing methods and processes can be found in the references cited above. In one exemplary method for making a polarizer, a single drawing step is used. This process may be performed in a tenter or a length orienter. Typical tenters draw transversely to the web path, although certain tenters are equipped with mechanisms to draw or relax (shrink) the film dimensionally in the web path or machine direction. Thus, in this exemplary method, a film is drawn in one in-plane direction. The second in-plane dimension is either held constant as in a conventional tenter, or is allowed to neck in to a smaller width as in a length orienter. Such necking in may be substantial and increase with draw ratio.

In another exemplary method for making a polarizer, sequential drawing steps are used. This process may be performed in a length orienter and/or a tenter. Typical length orienter draws in the web path direction while a tenter draws transversely to the web path. In one exemplary method, a film is drawn sequentially in both in-plane directions in a roll-to-roll process. Yet in another exemplary method, a film is drawn simultaneously in both in-plane directions in a batch orienter. Yet in another exemplary method, a film is drawn in a batch orienter only in one direction while the width in the other direction is held constant.

In one exemplary method for making a mirror, a two step drawing process is used to orient the birefringent material in both in-plane directions. The draw processes may be any combination of the single step processes described above and that allow drawing in two in-plane directions. In addition, a tenter that allows drawing along the machine direction, e.g. a biaxial tenter which can draw in two directions sequentially or simultaneously, may be used. In this latter case, a single biaxial draw process may be used.

In still another method for making a polarizer, a multiple drawing process is used that exploits the different behavior of the various materials to the individual drawing steps to make the different layers comprising the different materials within a single coextruded multilayer film possess different degrees and types of orientation relative to each other. Mirrors can also be formed in this manner.

As described in the references cited above, the reflective and transmissive properties of the multilayer optical film disclosed herein are a function of the refractive indices of the respective layers. Each layer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. In practice, the refractive indices are controlled by judicious materials selection and processing conditions.

The individual layers have thicknesses and refractive indices that are tailored to provide one or more reflection bands in desired region(s) of the spectrum, such as in the visible or near infrared. In order to achieve high reflectivities with a reasonable number of layers, adjacent nanolayers preferably exhibit a difference in refractive index ($\Delta n_x$) for light polarized along the x-axis of at least 0.04. If the high reflectivity is desired for two orthogonal polarizations, then the adjacent nanolayers also preferably exhibit a difference in refractive index ($\Delta n_y$) for light polarized along the y-axis of at least 0.04.

The following examples are for illustration and are not meant to limit the scope of the invention in any way.

EXAMPLES

Chemicals and polymers used throughout the Examples were obtained as indicated:
Terephthalic acid (TA); BP Chemicals (Naperville, Ill.)
Dimethyl terephthalate (DMT); Invista (Wilmington, N.C.)
2,6-Naphthalenedicarboxylic acid (2,6-NDA); BP Chemicals (Naperville, Ill.)
Dimethyl 2,6-napthalenedicarboxylate (DM-2,6-NDC); BP Chemicals (Naperville, Ill.)
4,4'-Bibenzoic acid; Odyssey Chemicals (Beijing, China)
Biphenyl 4,4'-dicarboxylic acid, dimethyl ester; Odyssey Chemicals (Beijing, China)
Isophthalic acid (IPA); Flint Hills Resources (Wichita, Kans.)
Sodium sulfoisophthalic acid (SSIPA); EasZDan Chemical Co. (Kingsport, Tenn.)
Dimethyl sodium sulfoisophthalate (DMSSIP); E.I. Dupont de Nemours (DE)
Ethylene glycol (EG); MEGlobal Americas Inc. (Midland, Mich.)
Trimethylolpropane (ZDP); Celanese Canada, Inc (Edmonton, AB, Canada)
Antimony triacetate; Arkema Chemicals Ltd. (Philadelphia, Pa.)
Zinc acetate; Spectrum Chemicals (Gardena, Calif.)
Sodium acetate; Alfa Aesar (Ward Hill, Mass.)
Cobalt acetate; Shepherd Chemical (Norwood, Ohio)
Triethyl phosphono acetate; Phosphate Products (Cranbury, N.J.)
EASTAR 6763 PETg; EasZDan Chemical Co. (Kingsport, Tenn.)
ESCORENE 1024 Polypropylene; ExxonMobil Corp. (Irving Tex.)
TOTAL 8650 Polypropylene copolymer; Total Petrochemicals (Houston, Tex.)

Example Set A

PETBB

Example 1

PETBB20 and Monolayer Film

PETBB20 is the designation for a copolyester nominally having 80 mol % terephthalate moieties and 20 mol % 4,4'-bibenzoate moieties, on an acids basis, and 100 mol % ethylene glycol moieties on a diols basis. It is well-known in the art and will be understood in this and all subsequent Examples that certain non-idealities occur in the polymerization and preparation of polyesters, such as the formation of small amounts of diethylene glycol (DEG).

PETBB20 resin was prepared as follows. To a room temperature stainless steel 10-gallon reactor kettle equipped with oil-jacketed heating, an overhead separation column, and a vacuum pump, the following were added:
    27.3 lbs. of terephthalic acid (0.164 lbmols)
    10.0 lbs. of 4,4'-bibenzoic acid (0.048 lbmols)
    31.9 lbs. of ethylene glycol (0.514 lbmols)
    8.5 g of antimony triacetate (as a catalyst)

The reaction mixture was heated and stirred at 110 rpm under 40 psig of $N_2$. The temperature was raised over the course of about 2 hours to 260° C. By-product water was driven off and collected in the overheads receiver. The pressure in the kettle was then slowly reduced to atmosphere. After 5 more minutes of stirring a vacuum was applied to the kettle. After stirring at about 25 rpm for about 2 hours at a temp of about 280° C. under vacuum (pressure of 1-5 mmHg), the reaction mixture reached the target endpoint, as indicated by an agitator power draw known for this reaction kettle to correlate to the rheology of a PET having an IV of 0.60. The resulting polymer was drained from the kettle into trays. These bricks of polymer resin were allowed to cool and were later ground into small, relatively uniform granules.

The PETBB20 granules so obtained were fed at about 10 lbs/hr to a 25 mm Berstorff twin-screw extruder having a length/diameter ratio (1/d) of 40 (Krauss Maffei Corp.—Florence, Ky.). The extruder temperature was profiled from feed to exit, beginning at 260° C. and rising to 280° C. The extruder was connected by a series of two ½" necktubes and a gear pump to a feedblock and a 9" die, all kept at 280° C. The die was adjusted to cast a PETBB20 film of about 20 mils thickness, which was quenched on a 12" diameter chill roll and then wound into a stockroll.

The resulting film was stretched in a laboratory batch film stretcher/orienter, at about 15-20° C. above the glass transition temperature of the PETBB20, to a stretch ratio of 1×5, with the specimen's sides constrained (to simulate the stretching behavior in a conventional film tenter). In this and all subsequent film stretching Examples, a KARO IV stretcher (Brueckner Maschinenbau GmbH & Co. KG—Siegsdorf, Germany) and a custom built stretcher of similar capabilities (for the purpose of these Examples) were used interchangeably. Refractive indices of the stretched films of PETBB20 in x, y, z directions were measured using a Metricon Prism Coupler (Metricon Corp.—Pennington, N.J.)

Example 2

PETBB35 and Monolayer Film

PETBB35 is the designation for a copolyester nominally having 65 mol % terephthalate moieties and 35 mol % 4,4'-bibenzoate moieties, on an acids basis, and 100 mol % ethylene glycol moieties on a diols basis.

PETBB35 resin was prepared as follows. To a room temperature stainless steel 10-gallon reactor kettle equipped with oil-jacketed heating, an overhead separation column, and a vacuum pump, the following were added:
    17.0 lbs. of terephthalic acid (0.102 lbmols)
    13.3 lbs. of 4,4'-bibenzoic acid (0.055 lbmols)
    21.0 lbs. of ethylene glycol (0.339 lbmols)
    13.5 g of antimony triacetate (as a catalyst)

The reaction mixture was heated and stirred at 110 rpm under 40 psig of $N_2$. The temperature was raised over the course of about 2 hours to 260° C. By-product water was driven off and collected in the overheads receiver. The pressure in the kettle was then slowly reduced to atmospheric. After 5 more minutes of stirring a vacuum was applied to the kettle. After stirring at about 25 rpm for about 2 hours at a temp of about 280° C. under vacuum (pressure of 1-5 mmHg), the reaction mixture reached the target endpoint, as indicated by an agitator power draw known for this reaction kettle to correlate to the rheology of a PET having an IV of 0.60. The resulting polymer was drained from the kettle into trays. These bricks of polymer resin were allowed to cool and were later ground into small, relatively uniform granules.

The PETBB35 granules so obtained were fed at about 10 lbs/hr to a 25 mm Berstorff twin-screw extruder having a length/diameter ratio (l/d) of 40 (Krauss Maffei Corp.—Florence, Ky.). The extruder temperature was profiled from feed to exit, beginning at 260° C. and rising to 280° C. The extruder was connected by a series of two ½" necktubes and a gear pump to a feedblock and a 9" die, all kept at 280° C. The die was adjusted to cast a PETBB35 film of about 20 mils thickness, which was quenched on a 12" diameter chill roll and then wound into a stockroll.

The resulting film was stretched in a laboratory batch film stretcher/orienter, at about 15-20° C. above the glass transition temperature of the PETBB35, to a stretch ratio of 1×5, with the specimen's sides constrained (to simulate the stretching behavior in a conventional film tenter). Refractive indices of the stretched films of PETBB35 in x, y, z directions were measured using a Metricon Prism Coupler (Metricon Corp.—Pennington, N.J.)

Example 3

PETBB35 Multi-Layer Film

A multilayer film having 61 alternating layers of an amorphous glycol-modified PET (PETg), and PETBB35, as low index and high index polymer, respectively, was prepared as follows: EASTAR 6763 PETg (EasZDan Chemical—Kingsport, Tenn.) was fed to 1.5" single screw extruder (Davis-Standard LLC, Pawcatuck, Conn.) and melt extruded at 260° C. PETBB35 was fed to a 25 mm Berstorff twin-screw extruder (Krauss Maffei Corp.—Florence, Ky.) and melt extruded at 260° C. The melt streams were brought together within a multilayer feedblock to form 61 alternating layers. ESCORENE 1024 Polypropylene (ExxonMobil Corp.—Irving, Tex.) was fed to 1" single screw extruder (Davis-Standard LLC, Pawcatuck, Conn.) and melt extruded at 260° C. This melt stream was introduced to the feedblock so as to form two outer protective skin layers. The feeding ratio of the three polymers was 1:1:1 (by wt.). The 63 layer multilayer melt flow from the feedblock was fed to a film die. The die was adjusted to cast a multilayer film of about 600 microns thickness, which was quenched on a chill roll and then wound into a stockroll.

The resulting film was stretched in a laboratory batch film stretcher/orienter, at about 15-20° C. above the glass transition temperature of the high index layer PETBB35, to a stretch ratio of 1×5, with the specimen's sides constrained (to simulate the stretching behavior in a conventional film tenter). The polypropylene skin layers were peeled off to expose the high index layers for refractive index measurements. Refractive indices of the PETBB35 layers in the stretched films, in x, y, z directions, were measured using a Metricon Prism Coupler (Metricon Corp.—Pennington, N.J.).

Example 4

PETBB45 and Monolayer Film

PETBB45 is the designation for a copolyester nominally having 55 mol % terephthalate moieties and 45 mol % 4,4'-bibenzoate moieties, on an acids basis, and 100 mol % ethylene glycol moieties on a diols basis.

PETBB45 resin was prepared as follows. To a room temperature stainless steel 10-gallon reactor kettle equipped with oil-jacketed heating, an overhead separation column, and a vacuum pump, the following were added:

18.1 lbs. of terephthalic acid (0.109 lbmols)
21.6 lbs. of 4,4'-bibenzoic acid ((0.089 lbmols)
26.46 lbs. of ethylene glycol (0.426 lbmols)
13.5 g of antimony triacetate (as a catalyst)

The reaction mixture was heated and stirred at 110 rpm under 40 psig of $N_2$. The temperature was raised over the course of about 2 hours to 260° C. By-product water was driven off and collected in the overheads receiver. The pressure in the kettle was then slowly reduced to atmospheric. After 5 more minutes of stirring a vacuum was applied to the kettle. After stirring at about 25 rpm for about 2 hours at a temp of about 280° C. under vacuum (pressure of 1-5 mmHg), the reaction mixture reached the target endpoint, as indicated by an agitator power draw known for this reaction kettle to correlate to the rheology of a PET having an IV of 0.60. The resulting polymer was drained from the kettle into trays. These bricks of polymer resin were allowed to cool and were later ground into small, relatively uniform granules.

The PETBB45 granules so obtained were fed at about 10 lbs/hr to a 25 mm Berstorff twin-screw extruder having a length/diameter ratio (l/d) of 40 (Krauss Maffei Corp.—Florence, Ky.). The extruder temperature was profiled from feed to exit, beginning at 260° C. and rising to 280° C. The extruder was connected by a series of two ½" necktubes and a gear pump to a feedblock and a 9" die, all kept at 280° C. The die was adjusted to cast a PETBB45 film of about 20 mils thickness, which was quenched on a 12" diameter chill roll and then wound into a stockroll.

The resulting film was stretched in a laboratory batch film stretcher/orienter, at about 15-20° C. above the glass transition temperature of the PETBB45, to a stretch ratio of 1×5, with the specimen's sides constrained (to simulate the stretching behavior in a conventional film tenter). Refractive indices of the stretched films of PETBB45 in x, y, z directions were measured using a Metricon Prism Coupler (Metricon Corp.—Pennington, N.J.).

Example 5

PETBB25 and Multi-Layer Film

PETBB25 is the designation for a copolyester nominally having 75 mol % terephthalate moieties and 25 mol % 4,4'-bibenzoate moieties, on an acids basis, and 100 mol % ethylene glycol moieties on a diols basis.

PETBB25 resin was produced by extrusion melt-blending PETBB20 with PETBB35 at a 2:1 ratio. Since polyesters undergo interchain transesterification when melt extruded, extruding together a blend of granules of two polyesters of differing composition results in an extrudate whose composition is uniform and reflects the average of the compositions of the input polymers.

A multilayer film having 61 alternating layers of an amorphous glycol-modified PET (PETg), and PETBB25, as low index and high index polymer, respectively, was prepared as follows: EASTAR 6763 PETg (EasZDan Chemical, Kingsport, Tenn.) was fed to 1.5" single screw extruder (Davis-Standard LLC, Pawcatuck, Conn.) and melt extruded at 260° C. PETBB35 was fed to a 25 mm Berstorff twin-screw extruder (Krauss Maffei Corp.—Florence, Ky.) and melt extruded at 260° C. The melt streams were brought together within a multilayer feedblock to form 61 alternating layers. ESCORENE 1024 Polypropylene (ExxonMobil Corp.—Irving, Tex.) was fed to 1" single screw extruder (Davis-Standard LLC, Pawcatuck, Conn.) and melt extruded at 260° C. This melt stream was introduced to the feedblock so as to form two outer protective skin layers. The feeding ratio of the three polymers was 1:1:1 (by wt.). The 63 layer multilayer melt flow from the feedblock was fed to a film die. The die was adjusted to cast a multilayer film of about 600 microns thickness, which was quenched on a chill roll and then wound into a stockroll.

The resulting film was stretched in a laboratory batch film stretcher/orienter, at about 15-20° C. above the glass transition temperature of the high index layer, PETBB25, to a stretch ratio of 1×5, with the specimen's sides constrained (to simulate the stretching behavior in a conventional film tenter). The polypropylene skin layers were peeled off to expose the high index layers for refractive index measurements. Refractive indices of the PETBB25 layers in the stretched films, in x, y, z directions, were measured using a Metricon Prism Coupler (Metricon Corp.—Pennington, N.J.).

Comparative Example C1

PEBB

PEBB is the designation for polyethylene bibenzoate, a polyester homopolymer nominally having 100 mol % 4,4'-bibenzoate moieties, on an acids basis, and 100 mol % ethylene glycol moieties on a diols basis.

PEBB was found to exhibit such a rapid rate of crystallization that it is not possible to process PEBB into a clear flat cast film under polyester film-making conditions similar to those outlined in the preceding Examples.

Comparative Example C2

PET and Multi-Layer Film

PET is the designation for polyethylene terephthalate, a polyester homopolymer nominally having 100 mol % terephthalate moieties, on an acids basis, and 100 mol % ethylene glycol moieties on a diols basis. The PET resin used in this Comparative Example was prepared by typical procedures known in the art, using dimethyl terephthalate as the terephthalate monomer, and is commercially available from 3M (St. Paul, Minn.).

A multilayer film incorporating PET and PETg was prepared in the same manner as the procedure detailed in Example 3. The cast film was then stretched in a batch stretcher/orienter in the same manner as in Example 3. The refractive indices were measured in the same manner as in Example 3.

Comparative Example C3

PETBB10 and Multi-Layer Film

PETBB10 is the designation for a copolyester nominally having 90 mol % terephthalate moieties and 10 mol % 4,4'-bibenzoate moieties, on an acids basis, and 100 mol % ethylene glycol moieties on a diols basis.

PETBB10 resin was prepared as follows. To a room temperature stainless steel 10-gallon reactor kettle equipped with oil-jacketed heating, an overhead separation column, and a vacuum pump, the following were added:
  40 lbs. of terephthalic acid (0.241 lbmols)
  6.5 lbs. of 4,4'-bibenzoic acid (0.027 lbmols)
  30.26 lbs. of ethylene glycol (0.488 lbmols)
  4.1 g of zinc acetate (as a catalyst)
  10.4 g of antimony triacetate (as a catalyst)

The reaction mixture was heated and stirred at 110 rpm under 30 psig of $N_2$. The temperature was raised over the course of about 2 hours to 260° C. By-product water was driven off and collected in the overheads receiver. The pressure in the kettle was then slowly reduced to atmospheric, and 4.1 g of triethyl phosphono acetate was added to the reactor. After 5 more minutes of stirring a vacuum was applied to the kettle. After stirring at about 25 rpm for about 2 hours at a temp of about 285° C. under vacuum (pressure of 1-5 mmHg), the reaction mixture reached the target endpoint, as indicated by an agitator power draw known for this reaction kettle to correlate to the rheology of a PET having an IV of 0.60. The resulting polymer was drained from the kettle into trays. These bricks of polymer resin were allowed to cool and were later ground into small, relatively uniform granules.

A multilayer film incorporating PETBB10 and PETg was prepared in the same manner as the procedure detailed in Example 3. The cast film was then stretched in a batch stretcher/orienter in the same manner as in Example 3. The refractive indices were measured in the same manner as in Example 3.

Comparative Example C4

PETBB55 and Monolayer Film

PETBB55 is the designation for a copolyester nominally having 45 mol % terephthalate moieties and 55 mol % 4,4'-bibenzoate moieties, on an acids basis, and 100 mol % ethylene glycol moieties on a diols basis.

PETBB55 resin was prepared as follows. To a room temperature stainless steel 10-gallon reactor kettle equipped with oil-jacketed heating, an overhead separation column, and a vacuum pump, the following were added:
  13.8 lbs. of terephthalic acid (0.083 lbmols)
  24.7 lbs. of 4,4'-bibenzoic acid (0.102 lbmols)
  28.7 lbs. of ethylene glycol (0.462 lbmols)
  8.7 g of antimony triacetate (as a catalyst)

The reaction mixture was heated and stirred at 110 rpm under 40 psig of $N_2$. The temperature was raised over the course of about 2 hours to 260° C. By-product water was driven off and collected in the overheads receiver. The pressure in the kettle was then slowly reduced to atmospheric, and 4.1 g of triethyl phosphono acetate was added to the reactor. After 5 more minutes of stirring a vacuum was applied to the kettle. After stirring at about 25 rpm for about 2 hours at a temp of about 285° C. under vacuum (pressure of 1-5 mmHg), the reaction mixture reached the target endpoint, as indicated by an agitator power draw known for this reaction kettle to correlate to the rheology of a PET having an IV of 0.60. The resulting polymer was drained from the kettle into trays. These bricks of polymer resin were allowed to cool and were later ground into small, relatively uniform granules.

A monolayer film of PETBB55 was prepared in the same manner as the procedure detailed in Example 1. Clear, amorphous, cast film of PETBB55 could not be produced due to the rapid crystallization rate of the polymer. As a result, no orientation of this material was successfully accomplished.

Comparative Example C5

PEN and Multi-Layer Film

PEN is the designation for polyethylene naphthalate, a polyester homopolymer nominally having 100 mol % 2,6-naphthalate moieties, on an acids basis, and 100 mol % ethylene glycol moieties on a diols basis. The PEN resin used in this Comparative Example was prepared by typical procedures known in the art, using dimethyl 2,6-naphthalene dicarboxylate (NDC) as the naphthalate monomer.

A multilayer film incorporating PEN and PETg was prepared in the same manner as the procedure detailed in Example 3. The cast film was then stretched in a batch stretcher/orienter in the same manner as in Example 3. The refractive indices were measured in the same manner as in Example 3.

Comparative Example C6

PETN80 and Monolayer Film

PETN80 is the designation for a copolyester nominally having 20 mol % terephthalate moieties and 80 mol % 2,6-naphthalate moieties, on an acids basis, and 100 mol % ethylene glycol moieties on a diols basis.

PETN80 resin was produced by extrusion melt-blending PET with PEN at a 1:4 ratio. Since polyesters undergo interchain transesterification when melt extruded, extruding together a blend of granules of two polyesters of differing composition results in an extrudate whose composition is uniform and reflects the average of the compositions of the input polymers.

A monolayer film of PETN80 was prepared in the same manner as the procedure detailed in Example 1. The cast film was then stretched in a batch stretcher/orienter in the same manner as in Example 1. The refractive indices were measured in the same manner as in Example 1.

Comparative Example C7

PETN60 and Monolayer Film

PETN60 is the designation for a copolyester nominally having 40 mol % terephthalate moieties and 60 mol % 2,6-naphthalate moieties, on an acids basis, and 100 mol % ethylene glycol moieties on a diols basis.

PETN60 resin was produced by extrusion melt-blending PET with PEN at a 2:3 ratio. Since polyesters undergo interchain transesterification when melt extruded, extruding together a blend of granules of two polyesters of differing composition results in an extrudate whose composition is uniform and reflects the average of the compositions of the input polymers.

A monolayer film of PETN60 was prepared in the same manner as the procedure detailed in Example 1. The cast film was then stretched in a batch stretcher/orienter in the same manner as in Example 1. The refractive indices were measured in the same manner as in Example 1.

Comparative Example C8

PETN40 and Monolayer Film

PETN40 is the designation for a copolyester nominally having 60 mol % terephthalate moieties and 40 mol % 2,6-naphthalate moieties, on an acids basis, and 100 mol % ethylene glycol moieties on a diols basis.

PETN40 resin was produced by extrusion melt-blending PET with PEN at a 3:2 ratio. Since polyesters undergo interchain transesterification when melt extruded, extruding together a blend of granules of two polyesters of differing composition results in an extrudate whose composition is uniform and reflects the average of the compositions of the input polymers.

A monolayer film of PETN40 was prepared in the same manner as the procedure detailed in Example 1. The cast film was then stretched in a batch stretcher/orienter in the same manner as in Example 1. The refractive indices were measured in the same manner as in Example 1.

Comparative Example C9

PETN15 and Monolayer Film

PETN15 is the designation for a copolyester nominally having 85 mol % terephthalate moieties and 15 mol % 2,6-naphthalate moieties, on an acids basis, and 100 mol % ethylene glycol moieties on a diols basis.

PETN15 resin was produced by extrusion melt-blending PET with PEN at a 17:3 ratio. Since polyesters undergo interchain transesterification when melt extruded, extruding together a blend of granules of two polyesters of differing composition results in an extrudate whose composition is uniform and reflects the average of the compositions of the input polymers.

A monolayer film of PETN15 was prepared in the same manner as the procedure detailed in Example 1. The cast film was then stretched in a batch stretcher/orienter in the same manner as in Example 1. The refractive indices were measured in the same manner as in Example 1.

The refractive indices of Examples 1-5 and Comparative Examples 1-9 (C1-C9) are shown in Table 5. In the table, n refers to refractive index, and the subscripts i, x, y, and z refer to the isotropic polymer before stretching, the stretch direction, the orthogonal in-plane or cross-web direction, and the thickness direction, after stretching, respectively. $\Delta n_{xy}$ refers to the difference in refractive index in the x and y directions (in-plane birefringence) and $\Delta n_{yz}$ refers to the difference in refractive index between the two non-stretched directions. The ratio of the in-plane birefringence to the birefringence of the two unstretched directions is shown in the column labeled "Ratio". A film exhibiting both high in-plane birefringence and low birefringence between the two unstretched directions has a high "Ratio".

Even though PETBB35 film has a intermediate refractive index in amorphous state (1.60), the birefringence developed during stretching appears to be close to that of PEN (0.28) and it is significantly higher than PET (0.16). The unexpected large birefringence of PETBB35 developed during stretching is typical with PETBB resins due to the formation of transparent liquid crystalline structure upon stretching. The birefringence development of PETBB can be adjusted to match the specific application by adjusting the BB monomer loading or degree of drawing. For example, the birefringence of PETBB35 can be further increased by increasing BB monomer loading in the polymer from 35 mol % to 45 mol %.

TABLE 5

| Ex. | Description | $n_i$ | $n_x$ | $n_y$ | $n_z$ | $\Delta n_{xy}$ | $\Delta n_{yz}$ | $\Delta n_{xy}/\Delta n_{yz}$ Ratio |
|---|---|---|---|---|---|---|---|---|
| 1 | PETBB20 | 1.592 | 1.742 | 1.564 | 1.525 | 0.178 | 0.039 | 4.6 |
| 2 | PETBB35 | 1.603 | 1.793 | 1.553 | 1.523 | 0.240 | 0.030 | 8.0 |
| 3 | PETBB35 | 1.603 | 1.793 | 1.553 | 1.529 | 0.240 | 0.024 | 10.0 |
| 4 | PETBB45 | 1.609 | 1.812 | 1.562 | 1.530 | 0.250 | 0.033 | 7.7 |
| 5 | PETBB25 | 1.595 | 1.743 | 1.560 | 1.522 | 0.183 | 0.038 | 4.8 |
| C1 | PEBB[1] | 1.644 | NM | NM | NM | NM | NM | NM |
| C2 | PET | 1.575 | 1.688 | 1.573 | 1.520 | 0.115 | 0.053 | 2.2 |
| C3 | PETBB10 | 1.586 | 1.712 | 1.579 | 1.516 | 0.133 | 0.063 | 2.1 |
| C4 | PETBB55[2] | 1.616 | NM | NM | NM | NM | NM | NM |
| C5 | PEN | 1.640 | 1.854 | 1.614 | 1.513 | 0.240 | 0.101 | 2.4 |
| C6 | PETN80 | 1.629 | 1.825 | 1.597 | 1.521 | 0.228 | 0.075 | 3.0 |
| C7 | PETN60 | 1.617 | 1.813 | 1.587 | 1.512 | 0.226 | 0.075 | 3.0 |
| C8 | PETN40 | 1.604 | 1.779 | 1.564 | 1.525 | 0.215 | 0.039 | 5.5 |
| C9 | PETN15 | 1.586 | 1.692 | 1.567 | 1.532 | 0.125 | 0.035 | 3.6 |

NM—Not Measurable
[1]Too stiff and crystalline to stretch successfully.
[2]Too hazy to stretch usefully. Accurate index measurement not possible.

Examples 1-5 show PETBB exhibits high in-plane birefringence, low through-thickness birefringence and good Ratios. Comparatives show PEBB homopolymer is largely unusable, PET homopolymer is not as good as the PETBBs, PETBB10 is too little BB, and PETBB %% is too much. PEN is not good because the through-thickness is really high—PETBBs are better than PEN. PETNs are also not as good as PETBBs. High N content leads to high through-thickness birefringence, and low N content leads to low in-plane birefringence.

Example Set B

PETBBi

Example 6

PETBB35-DMI1 and Monolayer Film

PETBB35-DMI1 is the designation for a copolyester nominally having 64 mol % terephthalate moieties, 35 mol % 4,4'-bibenzoate moieties, and 1 mol % isophthalate moieties on an acids basis, and 100 mol % ethylene glycol moieties on a diols basis.

PETBB35-DMI1 resin was prepared as follows. To a room temperature stainless steel 2-gallon reactor kettle equipped with electrical heating, an overhead separation column, and a vacuum pump, the following were added:
 2088 g of terephthalic acid (10.39 gmols)
 1634 g of 4,4'-bibenzoic acid (8.56 gmols)
 42.4 g of isophthalic acid (0.19 gmols)
 3026 g of ethylene glycol (57.05 gmols)
 0.8 g of sodium acetate (as a catalyst)
 1.9 g of antimony triacetate (as a catalyst)

The reaction mixture was heated and stirred at 110 rpm under 40 psig of $N_2$. The temperature was raised over the course of about 2 hours to 260° C. By-product water was driven off and collected in the overheads receiver. The pressure in the kettle was then slowly reduced to atmosphere. After 5 more minutes of stirring a vacuum was applied to the kettle. After stirring at about 50 rpm for about 2 hours at a temp of about 280° C. under vacuum (pressure of 1-5 mmHg), the reaction mixture reached the target endpoint, as indicated by an agitator power draw known for this reaction kettle to correlate to the rheology of a PET having an IV of 0.60. The resulting polymer was drained from the kettle into trays. These bricks of polymer resin were allowed to cool and were later ground into small, relatively uniform granules.

The PETBB35-DMI1 granules so obtained were fed at about 10 lbs/hr to a Berstorff 25 mm twin-screw extruder having a length/diameter ratio (l/d) of 40 (Krauss Maffei Corp.—Florence, Ky.). The extruder temperature was profiled from feed to exit, beginning at 260° C. and rising to 280° C. The extruder was connected by a series of two ½" necktubes and a gear pump to a feedblock and a 9" die, all kept at 280° C. The die was adjusted to cast a PETBB35-DMI1 film of about 20 mils thickness, which was quenched on a 12" diameter chill roll and then wound into a stockroll.

The resulting film was stretched in a laboratory batch film stretcher/orienter, at about 15-20° C. above the glass transition temperature of the PETBB35-DMI1, to a stretch ratio of 1×5, with the specimen's sides constrained (to simulate the stretching behavior in a conventional film tenter). Refractive indices of the stretched films of PETBB35-DMI1 in x, y, z directions were measured using a Metricon Prism Coupler (Metricon Corp.—Pennington, N.J.).

Example 7

PETBB35-DMSSIP1 and Monolayer Film

PETBB35-DMSSIP1 is the designation for a copolyester nominally having 64 mol % terephthalate moieties, 35 mol % 4,4'-bibenzoate moieties, and 1 mol % sodium sulfoisophthalate moieties on an acids basis, and 100 mol % ethylene glycol moieties on a diols basis.

PETBB35-DMSSIP1 was prepared as follows. To a room temperature stainless steel 10-gallon reactor kettle equipped with oil jacketed heating, an overhead separation column, and a vacuum pump, the following were added:
 20.8 lbs. of terephthalic acid (56.8 gmols)
 16.6 lbs. of 4,4'-bibenzoic acid (31.1 gmols)
 0.52 lbs. of sodium sulfoisophthalic acid (0.88 gmols)
 30.3 lbs. of ethylene glycol (222 gmols)
 8.6 g of antimony triacetate (as a catalyst)

The reaction mixture was heated and stirred at 110 rpm under 40 psig of $N_2$. The temperature was raised over the course of about 2 hours to 260° C. By-product water was driven off and collected in the overheads receiver. The pressure in the kettle was then slowly reduced to atmospheric. After 5 more minutes of stirring a vacuum was applied to the kettle. After stirring at about 25 rpm for about 2 hours at a temp of about 285° C. under vacuum (pressure of 1-5 mmHg), the reaction mixture reached the target endpoint, as indicated by an agitator power draw known for this reaction kettle to correlate to the rheology of a PET having an IV of 0.60. The resulting polymer was drained from the kettle into trays. These bricks of polymer resin were allowed to cool and were later ground into small, relatively uniform granules.

The PETBB35-DMSSIP1 granules so obtained were fed at about 10 lbs/hr to a 25 mm Berstorff twin-screw extruder having a length/diameter ratio (l/d) of 40 (Krauss Maffei Corp.—Florence, Ky.). The extruder temperature was profiled from feed to exit, beginning at 260° C. and rising to 280° C. The extruder was connected by a series of two ½" necktubes and a gear pump to a feedblock and a 9" die, all kept at 280° C. The die was adjusted to cast a PETBB35-DMSSIP1 film of about 20 mils thickness, which was quenched on a 12" diameter chill roll and then wound into a stockroll.

The resulting film was stretched in a laboratory batch film stretcher/orienter, at about 15-20° C. above the glass transition temperature of the PETBB35-DMSSIP1, to a stretch ratio of 1×5, with the specimen's sides constrained (to simulate the stretching behavior in a conventional film tenter). Refractive indices of the stretched films of PETBB35-DMSSIP1 in x, y, z directions were measured using a Metricon Prism Coupler (Metricon Corp.—Pennington, N.J.).

Example 8

PETBB35-DMSSIP1 Multi-Layer Film

A multilayer film having 61 alternating layers of an amorphous glycol-modified PET (PETg), and PETBB35-DMSSIP1, as low index and high index polymer, respectively, was prepared as follows: EASTAR 6763 PETg (EasZDan Chemical, Kingsport, Tenn.) was fed to 1.5" single screw extruder (Davis-Standard LLC, Pawcatuck, Conn.) and melt extruded at 260° C. PETBB35-DMSSIP1 was fed to a 25 mm Berstorff twin-screw extruder (Krauss Maffei Corp.—Florence, Ky.) and melt extruded at 260° C. The melt streams were brought together within a multilayer feedblock to form 61 alternating layers. ESCORENE 1024 Polypropylene (ExxonMobil Corp.—Irving, Tex.) was fed to 1" single screw extruder (Davis-Standard LLC, Pawcatuck, Conn.) and melt extruded at 260° C. This melt stream was introduced to the feedblock so as to form two outer protective skin layers. The feeding ratio of the three polymers was 1:1:1 (by wt.). The 63 layer multilayer melt flow from the feedblock was fed to a film die. The die was adjusted to cast a multilayer film of about 600 microns thickness, which was quenched on a chill roll and then wound into a stockroll.

The resulting film was stretched in a laboratory batch film stretcher/orienter, at about 15-20° C. above the glass transition temperature of the high index layer, PETBB35-DMSSIP1, to a stretch ratio of 1×5, with the specimen's sides constrained (to simulate the stretching behavior in a conventional film tenter). The polypropylene skin layers were peeled off to expose the high index layers for refractive index measurements. Refractive indices of the PETBB35-DMSSIP1 layers in the stretched films, in x, y, z directions, were measured using a Metricon Prism Coupler (Metricon Corp.—Pennington, N.J.).

Example 8A

PETBB45-DMSSIP1 and Monolayer Film

PETBB45-DMSSIP1 is the designation for a copolyester nominally having 54 mol % terephthalate moieties, 45 mol % 4,4'-bibenzoate moieties, and 1 mol % sodium sulfoisophthalate moieties on an acids basis, and 100 mol % ethylene glycol moieties on a diols basis. PETBB45-DMSSIP1 was prepared as follows. To a room temperature stainless steel 2-gallon reactor kettle equipped with electric heating, an overhead separation column, and a vacuum pump, the following were added:
1680 g of terephthalic acid (10.11 gmols)
2042 g of 4,4'-bibenzoic acid (8.43 gmols)
50.22 g of sodium sulfoisophthalic acid (0.88 gmols)
2476 g of ethylene glycol (0.19 gmols)

1.9 g of antimony triacetate (as a catalyst)
0.9 g of sodium acetate (as a catalyst)

The reaction mixture was heated and stirred at 110 rpm under 40 psig of $N_2$. The temperature was raised over the course of about 2 hours to 260° C. By-product water was driven off and collected in the overheads receiver. The pressure in the kettle was then slowly reduced to atmosphere. After 5 more minutes of stirring a vacuum was applied to the kettle. After stirring at about 50 rpm for about 2 hours at a temp of about 280° C. under vacuum (pressure of 1-5 mmHg), the reaction mixture reached the target endpoint, as indicated by an agitator power draw known for this reaction kettle to correlate to the rheology of a PET having an IV of 0.60. The resulting polymer was drained from the kettle into trays. These bricks of polymer resin were allowed to cool and were later ground into small, relatively uniform granules.

The PETBB45-DMSSIP1 granules so obtained were fed at about 10 lbs/hr to a 25 mm Berstorff twin-screw extruder having a length/diameter ratio (1/d) of 40 (Krauss Maffei Corp.—Florence, Ky.). The extruder temperature was profiled from feed to exit, beginning at 260° C. and rising to 280° C. The extruder was connected by a series of two ½" necktubes and a gear pump to a feedblock and a 9" die, all kept at 280° C. The die was adjusted to cast a PETBB45-DMSSIP1 film of about 20 mils thickness, which was quenched on a 12" diameter chill roll and then wound into a stockroll.

The resulting film was stretched in a laboratory batch film stretcher/orienter, at about 15-20° C. above the glass transition temperature of the PETBB45-DMSSIP1, to a stretch ratio of 1×5, with the specimen's sides constrained (to simulate the stretching behavior in a conventional film tenter). Refractive indices of the stretched films of PETBB45-DMSSIP1 in x, y, z directions were measured using a Metricon Prism Coupler (Metricon Corp.—Pennington, N.J.). This film exhibited a little haze.

Refractive indices of Examples 6-8A, and, for purposes of comparison, Ex. 2, in x, y, z directions are shown in Table 6.

Refractive indices of the high index layers (PETBB35-DMI1 and PETBB35-DMSSIP1) in x, y, z directions are shown in Table 7. The ratio of the in-plane birefringence to the birefringence of the two unstretched directions is shown in the column labeled "Ratio".

TABLE 6

| Ex. | Description | $n_x$ | $n_y$ | $n_z$ | $\Delta n_{xy}$ | $\Delta n_{yz}$ | $\Delta n_{xy}/\Delta n_{yz}$ Ratio |
|---|---|---|---|---|---|---|---|
| 2 | PETBB35 | 1.793 | 1.553 | 1.523 | 0.240 | 0.030 | 8.0 |
| 6 | PETBB35-DMI1 | 1.793 | 1.576 | 1.553 | 0.217 | 0.023 | 9.4 |
| 7 | PETBB35-DMSSIP1 | 1.780 | 1.543 | 1.531 | 0.237 | 0.012 | 19.8 |
| 8 | PETBB35-DMSSIP1 | 1.780 | 1.554 | 1.541 | 0.226 | 0.013 | 17.4 |
| 8A | PETBB45-DMSSIP1 | 1.802 | 1.549 | 1.536 | 0.253 | 0.013 | 19.3 |

This set shows why adding a little ionomer is good. If we add just the backbone unit that can hold the ion, but not the ion itself (Ex. 6) the behavior doesn't change much. If we add 1% of the ionomer, in-plane birefringence doesn't change much, but thorough-thickness really drops, so the Ratio is huge (ex. 7-8) Finally, in 8A, one sees that adding the 1% ionomer to PETBB45 also works and provides great optics.

Comparative Example C10

PETN80 and Monolayer Film

PETN80 is the designation for a copolyester nominally having 20 mol % terephthalate moieties and 80 mol % 2,6-naphthalate moieties, on an acids basis, and 100 mol % ethylene glycol moieties on a diols basis. The PETN80 preparation shown below also contains a very minor amount of a glycol branching agent, trimethylol propane.

PETN80 resin was prepared as follows. To a room temperature stainless steel 10-gallon reactor kettle equipped with oil-jacketed heating, an overhead separation column, and a vacuum pump, the following were added:
  7.21 lbs. of dimethyl terephthalate
  36.27 lbs. of dimethyl 2,6-naphthalene dicarboxylate
  28.8 lbs. of ethylene glycol
  30 g of trimethylol propane
  3.0 g of zinc acetate (as a catalyst)
  4.9 g of cobalt acetate (as a catalyst)
  7.9 g of antimony triacetate (as a catalyst)

The reaction mixture was heated and stirred at 110 rpm under 20 psig of $N_2$. The temperature was raised over the course of about 2 hours to 250° C. By-product methanol was driven off and collected in the overheads receiver. The pressure in the kettle was then slowly reduced to atmosphere, and 7.9 g of triethyl phosphono acetate was added to the reactor. After 5 more minutes of stirring a vacuum was applied to the kettle. After stirring at about 25 rpm for about 2 hours at a temp of about 280° C. under vacuum (pressure of 1-5 mmHg), the reaction mixture reached the target endpoint, as indicated by an agitator power draw known for this reaction kettle to correlate to the rheology of a PET having an IV of 0.60. The resulting polymer was drained from the kettle into trays. These bricks of polymer resin were allowed to cool and were later ground into small, relatively uniform granules.

The PETN80 granules so obtained were fed at about 10 lbs/hr to a 25 mm Berstorff twin-screw extruder having a length/diameter ratio (lid) of 40 (Krauss Maffei Corp.—Florence, Ky.). The extruder temperature was profiled from feed to exit, beginning at 260° C. and rising to 280° C. The extruder was connected by a series of two ½" necktubes and a gear pump to a feedblock and a 9" die, all kept at 280° C. The die was adjusted to cast a PETN80 film of about 20 mils thickness, which was quenched on a 12" diameter chill roll and then wound into a stockroll.

The resulting film was stretched in a laboratory batch film stretcher/orienter, at about 15-20° C. above the glass transition temperature of the PETN80, to a stretch ratio of 1×5, with the specimen's sides constrained (to simulate the stretching behavior in a conventional film tenter). Refractive indices of the stretched films of PETN80 in x, y, z directions were measured using a Metricon Prism Coupler (Metricon Corp.—Pennington, N.J.).

Comparative Example C11

PETN80-DMSSIP1 and Monolayer Film

PETN80-DMSSIP1 is the designation for a copolyester nominally having 19 mol % terephthalate moieties, 80 mol % 2,6-naphthalate moieties, and 1 mol % sodium sulfoisophthalate moieties on an acids basis, and 100 mol % ethylene glycol moieties on a diols basis. The PETN80-DMSSIP1 preparation shown below also contains a very minor amount of a glycol branching agent, trimethylol propane.

PETN80-DMSSIP1 resin was prepared as follows. To a room temperature stainless steel 10-gallon reactor kettle equipped with oil-jacketed heating, an overhead separation column, and a vacuum pump, the following were added:
  6.83 lbs. of dimethyl terephthalate
  36.15 lbs. of dimethyl 2,6-naphthalene dicarboxylate
  0.55 lbs. of dimethyl sodiumsulfoisophthalate
  28.8 lbs. of ethylene glycol
  30 g of trimethylol propane
  2.5 g of sodium acetate (as a catalyst)
  3.0 g of zinc acetate (as a catalyst)
  4.9 g of cobalt acetate (as a catalyst)
  7.9 g of antimony triacetate (as a catalyst)

The reaction mixture was heated and stirred at 110 rpm under 20 psig of $N_2$. The temperature was raised over the course of about 2 hours to 250° C. By-product methanol was driven off and collected in the overheads receiver. The pressure in the kettle was then slowly reduced to atmosphere, and 7.9 g of triethyl phosphono acetate was added to the reactor. After 5 more minutes of stirring a vacuum was applied to the kettle. After stirring at about 25 rpm for about 2 hours at a temp of about 280° C. under vacuum (pressure of 1-5 mmHg), the reaction mixture reached the target endpoint, as indicated by an agitator power draw known for this reaction kettle to correlate to the rheology of a PET having an IV of 0.60. The resulting polymer was drained from the kettle into trays. These bricks of polymer resin were allowed to cool and were later ground into small, relatively uniform granules.

The PETN80-DMSSIP1 granules so obtained were fed at about 10 lbs/hr to a 25 mm Berstorff twin-screw extruder having a length/diameter ratio (1/d) of 40 (Krauss Maffei Corp.—Florence, Ky.). The extruder temperature was profiled from feed to exit, beginning at 260° C. and rising to 280° C. The extruder was connected by a series of two ½" necktubes and a gear pump to a feedblock and a 9" die, all kept at 280° C. The die was adjusted to cast a PETN80-DMSSIP1 film of about 20 mils thickness, which was quenched on a 12" diameter chill roll and then wound into a stockroll.

The resulting film was stretched in a laboratory batch film stretcher/orienter, at about 15-20° C. above the glass transition temperature of the PETN80-DMSSIP1, to a stretch ratio of 1×5, with the specimen's sides constrained (to simulate the stretching behavior in a conventional film tenter). Refractive indices of the stretched films of PETN80-DMSSIP1 in x, y, z directions were measured using Metricon Prism Coupler (Metricon Corp.—Pennington, N.J.).

Comparative Example C12

PETN80-DMSSIP2 and Monolayer Film

PETN80-DMSSIP2 is the designation for a copolyester nominally having 18 mol % terephthalate moieties, 80 mol % 2,6-naphthalate moieties, and 2 mol % sodium sulfoisophthalate moieties on an acids basis, and 100 mol % ethylene glycol moieties on a diols basis. The PETN80-DMSSIP2 preparation shown below also contains a very minor amount of a glycol branching agent, trimethylol propane.

PETN80-DMSSIP1 resin was prepared as follows. To a room temperature stainless steel 10-gallon reactor kettle equipped with oil-jacketed heating, an overhead separation column, and a vacuum pump, the following were added:
- 6.44 lbs. of dimethyl terephthalate
- 36.02 lbs. of dimethyl 2,6-naphthalene dicarboxylate
- 1.09 lbs. of dimethyl sodiumsulfoisophthalate
- 28.6 lbs. of ethylene glycol
- 30 g of trimethylol propane
- 5 g of sodium acetate (as a catalyst)
- 3.0 g of zinc acetate (as a catalyst)
- 4.9 g of cobalt acetate (as a catalyst)
- 7.9 g of antimony triacetate (as a catalyst)

The reaction mixture was heated and stirred at 110 rpm under 20 psig of $N_2$. The temperature was raised over the course of about 2 hours to 250° C. By-product methanol was driven off and collected in the overheads receiver. The pressure in the kettle was then slowly reduced to atmosphere, and 7.9 g of triethyl phosphono acetate was added to the reactor. After 5 more minutes of stirring a vacuum was applied to the kettle. After stirring at about 25 rpm for about 2 hours at a temp of about 280° C. under vacuum (pressure of 1-5 mmHg), the reaction mixture reached the target endpoint, as indicated by an agitator power draw known for this reaction kettle to correlate to the rheology of a PET having an IV of 0.60. The resulting polymer was drained from the kettle into trays. These bricks of polymer resin were allowed to cool and were later ground into small, relatively uniform granules.

The PETN80-DMSSIP2 granules so obtained were fed at about 10 lbs/hr to a 25 mm Berstorff twin-screw extruder having a length/diameter ratio (1/d) of 40 (Krauss Maffei Corp.—Florence, Ky.). The extruder temperature was profiled from feed to exit, beginning at 260° C. and rising to 280° C. The extruder was connected by a series of two ½" necktubes and a gear pump to a feedblock and a 9" die, all kept at 280° C. The die was adjusted to cast a PETN80-DMSSIP2 film of about 20 mils thickness, which was quenched on a 12" diameter chill roll and then wound into a stockroll.

The resulting film was stretched in a laboratory batch film stretcher/orienter, at about 15-20° C. above the glass transition temperature of the PETN80-DMSSIP2, to a stretch ratio of 1×5, with the specimen's sides constrained (to simulate the stretching behavior in a conventional film tenter). Refractive indices of the stretched films of PETN80-DMSSIP2 in x, y, z directions were measured using a Metricon Prism Coupler (Metricon Corp.—Pennington, N.J.).

Refractive index results are shown in Table 7.

TABLE 7

| Ex. | Description | $n_x$ | $n_y$ | $n_z$ | $\Delta n_{xy}$ | $\Delta n_{yz}$ | $\Delta n_{xy}/\Delta n_{yz}$ Ratio |
|---|---|---|---|---|---|---|---|
| 2 | PETBB35 | 1.793 | 1.553 | 1.523 | 0.240 | 0.030 | 8.0 |
| 7 | PETBB35-DMSSIP1 | 1.780 | 1.543 | 1.531 | 0.237 | 0.012 | 19.8 |
| C10 | PETN80 | 1.809 | 1.603 | 1.528 | 0.206 | 0.075 | 2.7 |
| C11 | PETN80I1 | 1.791 | 1.596 | 1.546 | 0.195 | 0.050 | 3.9 |
| C12 | PETN80I2 | 1.795 | 1.591 | 1.542 | 0.204 | 0.049 | 4.2 |

Exs. C10-C12 are here to show that when we put ionomer in a related polymer, PETN, we got a small improvement in performance, but not so much as in PETBB. Also, that small improvement carried over to 2%, which is why we believe up to about 2% would be good in PETBB as well, even though we have not yet made it. More than 2% has problems in all optical-quality polyesters.

Example Set C

PETNBB

Example 9

PET22N51BB27 and Monolayer Film (PEN/PETBB55 50/50 Blend)

PET22N51BB27 is the designation for a copolyester nominally having 22 mol % terephthalate moieties, 51% 2,6-naphthalate moieties, and 27 mol % 4,4'-bibenzoate moieties, on an acids basis, and 100 mol % ethylene glycol moieties on a diols basis.

PET22N51BB27 resin was produced by extrusion melt-blending PETBB55 with PEN at a 1:1 ratio. Since polyesters undergo interchain transesterification when melt extruded, extruding together a blend of granules of two polyesters of differing composition results in an extrudate whose composition is uniform and reflects the average of the compositions of the input polymers.

The PETBB55 and PEN, each obtained as described previously, were each fed at about 7.5 lbs/hr to a 25 mm Berstorff twin-screw extruder having a length/diameter ratio (1/d) of 40 (Krauss Maffei Corp.—Florence, Ky.). The extruder temperature was profiled from feed to exit, beginning at 190° C. and rising to 280° C. The extruder was connected by a series of two ½" necktubes and a gear pump to a feedblock and a 9" die, all kept at 280° C. The die was adjusted to cast a PET22N51BB27 film of about 20 mils thickness, which was quenched on a 12" diameter chill roll and then wound into a stockroll The resulting film was stretched in a laboratory batch film stretcher/orienter, at about 15-20° C. above the glass transition temperature of the PET22N51BB27, to a stretch ratio of 1×5, with the specimen's sides constrained (to simulate the stretching behavior in a conventional film tenter). Refractive indices of the stretched films of PET22N51BB27 in x, y, z directions were measured using a Metricon Prism Coupler (Metricon Corp.—Pennington, N.J.).

Example 10

PET32N42BB26 and Monolayer Film (PEN/PETBB45 40/60 Blend)

PET32N42BB26 is the designation for a copolyester nominally having 32 mol % terephthalate moieties, 42% 2,6-naphthalate moieties, and 26 mol % 4,4'-bibenzoate moieties, on an acids basis, and 100 mol % ethylene glycol moieties on a diols basis.

PET32N42BB26 resin was produced by extrusion melt-blending PETBB45 with PEN at a 3:2 ratio. Since polyesters undergo interchain transesterification when melt extruded, extruding together a blend of granules of two polyesters of differing composition results in an extrudate whose composition is uniform and reflects the average of the compositions of the input polymers.

The PETBB45 and PEN, each obtained as described previously, were each fed at about 9 lbs/hr and 6 lbs/hr, respectively, to a 25 mm Berstorff twin-screw extruder having a length/diameter ratio (1/d) of 40 (Krauss Maffei Corp.—Florence, Ky.). The extruder temperature was profiled from feed to exit, beginning at 190° C. and rising to 280° C. The extruder was connected by a series of two ½" necktubes and a gear pump to a feedblock and a 9" die, all kept at 280° C. The die was adjusted to cast a PET32N42BB26 film of about 20 mils thickness, which was quenched on a 12" diameter chill roll and then wound into a stockroll The resulting film was stretched in a laboratory batch film stretcher/orienter, at about 15-20° C. above the glass transition temperature of the PET32N42BB26, to a stretch ratio of 1×5, with the specimen's sides constrained (to simulate the stretching behavior in a conventional film tenter). Refractive indices of the stretched films of PET32N42BB26 in x, y, z directions were measured using a Metricon Prism Coupler (Metricon Corp.—Pennington, N.J.).

Example 11

PET44N32BB24 and Monolayer Film
(PEN/PETBB35 30/70 Blend)

PET44N32BB24 is the designation for a copolyester nominally having 44 mol % terephthalate moieties, 32% 2,6-naphthalate moieties, and 24 mol % 4,4'-bibenzoate moieties, on an acids basis, and 100 mol % ethylene glycol moieties on a diols basis.

PET44N32BB24 resin was produced by extrusion melt-blending PETBB35 with PEN at a 7:3 ratio. Since polyesters undergo interchain transesterification when melt extruded, extruding together a blend of granules of two polyesters of differing composition results in an extrudate whose composition is uniform and reflects the average of the compositions of the input polymers.

The PETBB35 and PEN, each obtained as described previously, were fed at about 10.5 lbs/hr and 4.5 lbs/hr, respectively, to a 25 mm Berstorff twin-screw extruder having a length/diameter ratio (l/d) of 40 (Krauss Maffei Corp.—Florence, Ky.). The extruder temperature was profiled from feed to exit, beginning at 190° C. and rising to 280° C. The extruder was connected by a series of two ½" necktubes and a gear pump to a feedblock and a 9" die, all kept at 280° C. The die was adjusted to cast a PET44N32BB24 film of about 20 mils thickness, which was quenched on a 12" diameter chill roll and then wound into a stockroll.

The resulting film was stretched in a laboratory batch film stretcher/orienter, at about 15-20° C. above the glass transition temperature of the PET44N32BB24, to a stretch ratio of 1×5, with the specimen's sides constrained (to simulate the stretching behavior in a conventional film tenter). Refractive indices of the stretched films of PET44N32BB24 in x, y, z directions were measured using a Metricon Prism Coupler (Metricon Corp.—Pennington, N.J.).

Example 12

PET37N54BB9 and Monolayer Film
(PEN/PETBB20 50/50 Blend)

PET37N54BB9 is the designation for a copolyester nominally having 37 mol % terephthalate moieties, 54% 2,6-naphthalate moieties, and 9 mol % 4,4'-bibenzoate moieties, on an acids basis, and 100 mol % ethylene glycol moieties on a diols basis.

PET37N54BB9 resin was produced by extrusion melt-blending PETBB20 with PEN at a 1:1 ratio. Since polyesters undergo interchain transesterification when melt extruded, extruding together a blend of granules of two polyesters of differing composition results in an extrudate whose composition is uniform and reflects the average of the compositions of the input polymers.

The PETBB20 and PEN, each obtained as described previously, were each fed at about 10 lbs/hr to a 25 mm Berstorff twin-screw extruder having a length/diameter ratio (l/d) of 40 (Krauss Maffei Corp.—Florence, Ky.). The extruder temperature was profiled from feed to exit, beginning at 260° C. and rising to 280° C. The extruder was connected by a series of two ½" necktubes and a gear pump to a feedblock and a 9" die, all kept at 280° C. The die was adjusted to cast a PET37N54BB9 film of about 20 mils thickness, which was quenched on a 12" diameter chill roll and then wound into a stockroll The resulting film was stretched in a laboratory batch film stretcher/orienter, at about 15-20° C. above the glass transition temperature of the PET37N54BB9, to a stretch ratio of 1×5, with the specimen's sides constrained (to simulate the stretching behavior in a conventional film tenter). Refractive indices of the stretched films of PET37N54BB9 in x, y, z directions were measured using a Metricon Prism Coupler (Metricon Corp.—Pennington, N.J.).

Examples 13-22 and Comparative Example C13

Using procedures similar to those detailed in Examples 9-12, additional PETNBB terepolymers were prepared by melt-extrusion-blending a PETBB copolymer with PEN, and monolayer films were cast and stretched. Table 8 gives preparation details of these Examples. Refractive index data for Examples 9-22 and Comparative Example C13 are tabulated in Table 9. PETNBB permutations give in-plane birefringence greater than 0.18.

TABLE 8

| Ex. | Description | PETBB used | PETBB:PEN Feed Ratio |
|---|---|---|---|
| 13 | PET5N90BB5 | PETBB55 | 1:9 |
| 14 | PET13N71BB16 | PETBB55 | 3:7 |
| 15 | PET31N31BB38 | PETBB55 | 7:3 |
| 16 | PET38N31BB31 | PETBB45 | 7:3 |
| 17 | PET43N21BB36 | PETBB45 | 8:2 |
| 18 | PET49N11BB40 | PETBB45 | 9:1 |
| 19 | PET58N11BB31 | PETBB35 | 9:1 |
| 20 | PET7N91BB2 | PETBB20 | 1:9 |
| 21 | PET22N73BB5 | PETBB20 | 3:7 |
| 22 | PET53N34BB13 | PETBB20 | 7:3 |
| C13 | PET71N11BB18 | PETBB20 | 9:1 |

TABLE 9

| Ex. | Description | $n_i$ | $n_x$ | $n_y$ | $n_z$ | $\Delta n_{xy}$ | $\Delta n_{yz}$ | $\Delta n_{xy}/\Delta n_{yz}$ Ratio |
|---|---|---|---|---|---|---|---|---|
| 9 | PET22N51BB27 | 1.628 | 1.845 | 1.593 | 1.530 | 0.252 | 0.063 | 4.0 |
| 10 | PET32N42BB26 | 1.622 | 1.834 | 1.579 | 1.527 | 0.255 | 0.053 | 4.9 |
| 11 | PET44N32BB24 | 1.615 | 1.814 | 1.568 | 1.529 | 0.246 | 0.039 | 6.4 |

TABLE 9-continued

| Ex. | Description | $n_i$ | $n_x$ | $n_y$ | $n_z$ | $\Delta n_{xy}$ | $\Delta n_{yz}$ | $\Delta n_{xy}/\Delta n_{yz}$ Ratio |
|---|---|---|---|---|---|---|---|---|
| 12 | PET37N54BB9 | 1.619 | 1.790 | 1.589 | 1.525 | 0.201 | 0.064 | 3.1 |
| 13 | PET5N90BB5 | NM | 1.847 | 1.608 | 1.520 | 0.239 | 0.088 | 2.7 |
| 14 | PET13N71BB16 | NM | 1.846 | 1.598 | 1.523 | 0.248 | 0.075 | 3.3 |
| 15 | PET31N31BB38 | NM | 1.844 | 1.582 | 1.523 | 0.262 | 0.059 | 4.4 |
| 16 | PET38N31BB31 | NM | 1.838 | 1.572 | 1.526 | 0.265 | 0.046 | 5.7 |
| 17 | PET43N21BB36 | NM | 1.836 | 1.563 | 1.526 | 0.273 | 0.037 | 7.5 |
| 18 | PET49N11BB40 | NM | 1.825 | 1.562 | 1.528 | 0.263 | 0.034 | 7.8 |
| 19 | PET58N11BB31 | NM | 1.798 | 1.562 | 1.532 | 0.237 | 0.030 | 7.9 |
| 20 | PET7N91BB2 | NM | 1.839 | 1.613 | 1.515 | 0.226 | 0.098 | 2.3 |
| 21 | PET22N73BB5 | NM | 1.811 | 1.605 | 1.518 | 0.206 | 0.087 | 2.4 |
| 22 | PET53N34BB13 | NM | 1.769 | 1.574 | 1.530 | 0.195 | 0.044 | 4.4 |
| C13 | PET71N11BB18 | NM | 1.734 | 1.569 | 1.533 | 0.165 | 0.036 | 4.6 |

NM = not measured

Example Set D

PENBB

Example 23

PENBB20 and Trilayer Film One-Way Stretched

PENBB20 is the designation for a copolyester nominally having 80 mol % 2,6-naphthalate moieties and 20 mol % 4,4'-bibenzoate moieties, on an acids basis, and 100 mol % ethylene glycol moieties on a diols basis.

PENBB20 resin was prepared as follows. To a room temperature stainless steel 2-gallon reactor kettle equipped with oil-jacketed heating, an overhead separation column, and a vacuum pump, the following were added:

7.5 lbs. of 2,6-naphthalene dicarboxylic acid (0.035 lbmols)

2.1 lbs. of biphenyldicarboxylic acid-methyl ester (0.09 lbmols)

6.06 lbs. of ethylene glycol (0.098 lbmols)

2.18 g of antimony triacetate (as a catalyst)

The reaction mixture was heated and stirred at 125 rpm under 40 psig of $N_2$. The temperature was raised over the course of about 1.5 hours to 260° C. By-product water was driven off and collected in the overheads receiver. The pressure in the kettle was then slowly reduced to atmosphere. After 5 more minutes of stirring a vacuum was applied to the kettle. After stirring at about 50 rpm for about 1.5 hours at a temp of about 280° C. under vacuum (pressure of 1-5 mmHg), the reaction mixture reached the target endpoint, as indicated by an agitator power draw known for this reaction kettle to correlate to the rheology of a PET having an IV of 0.60. The resulting polymer was drained from the kettle into trays. These bricks of polymer resin were allowed to cool and were later ground into small, relatively uniform granules.

The PENBB20 granules so obtained were fed at about 10 lbs/hr to a 25 mm Berstorff twin-screw extruder having a length/diameter ratio (l/d) of 40 (Krauss Maffei Corp.—Florence, Ky.). The extruder temperature was profiled from feed to exit, beginning at 170° C. and rising to 280° C. The extruder was connected by a series of two ½" necktubes and a gear pump to the B layer of a ABC trilayer feedblock with 9" die. A polypropylene copolymer, TOTAL 8650 (Total Petrochemicals—Houston, Tex.) was fed at 6 lbs/hr to a 1" Berstorff single screw extruder (Krauss Maffei Corp.—Florence, Ky.). The extruder temperature was profiled from feed to exit, beginning at 240° C. and rising to 275° C. TOTAL 8650 polypropylene copolymer was also fed at 6 lbs/hr to a 1.5" Berstorff single screw extruder (Krauss Maffei Corp.—Florence, Ky.). The extruder temperature was profiled from feed to exit, beginning at 240° C. and rising to 275° C. These two extruders fed the A and C layers of the trilayer feedblock. The die was adjusted to cast a trilayer film of about 30 mils thickness, which was quenched on a 12" diameter chill roll and then wound into a stockroll.

The resulting film was stretched in a laboratory batch film stretcher/orienter, at about 15-20° C. above the glass transition temperature of the PETBB20, to a stretch ratio of 1×5, with the specimen's sides constrained (to simulate the stretching behavior in a conventional film tenter). Refractive indices of the stretched films of PENBB20 n x, y, z directions were measured using a Metricon Prism Coupler (Metricon Corp.—Pennington, N.J.).

Example 24

PENBB20 Monolayer Film Biaxially Stretched; and

Comparative Example C14

PEN Monolayer Film Biaxially Stretched

A PENBB20 film prepared as a monolayer film, but otherwise similarly to the central layer of the 3-layer film of Example 23, and a PEN monolayer film, were stacked with a 5 mil layer of polypropylene ESCORENE 1024 (Exxon-Mobil Corp.—Irving, Tex.) in between and stretched in a simultaneous biaxial mode, at 15-20° C. above the glass transition temperature of the PENBB20. Nominal stretch ratios were 3.5×3.5. Actual stretch ratios in the center of the film specimen were measured using fiducial marks printed on the film prior to stretching. These measured stretch ratios were significantly higher than the nominal, averaging to about 4.5 over the two directions, and favoring the y direction slightly. Monolayers of PENBB20 and PEN were peeled apart from the ESCORENE 1024 for refractive indices measurement. Refractive indices of the stretched films of PENBB20 in x, y, z directions were measured using a Metricon Prism Coupler (Metricon Corp.—Pennington, N.J.).

Example 25

PENBB20 Multilayer Biaxially Stretched

To demonstrate that the bibenzoate-containing polymers of the present invention are stretchable when formed into multilayer films, a multilayer film having 151 alternating layers of PEN and PENBB20 was prepared using a coextrusion process as generally described in U.S. Pat. No. 6,830,713 (Hebrink, et al.). PEN was fed to two extruders and PENBB was fed to a third extruder. The first PEN extrudate stream, at about 282° C. and the PENBB20 extrudate stream, at about 260° C. were fed to a 151 alternating layer feedblock, at about 285° C., the feedblock having a gradient feed plate that provided a layer thickness gradient through the film thickness. Two protective boundary layers of PEN, each about 4% of the thickness of the multilayer stack, were produced in the feedblock. At a point prior to entry to the film die, two additional skin layers of PEN were added to the stack using the extrudate from the second PEN extruder, also at about 282° C. The multilayer construction was cast from a film die held at about 279° C., and electrostatically pinned to and quenched on a chill roll. Film of about 335 micron thickness was wound into a stockroll. The relative mass flows of the first PEN extruder, the PENBB20 extruder, and the second PEN extruder, were 9:7:15.

Specimens of the film were stretched simultaneously biaxially using a laboratory film stretcher. These films could be successfully stretched at about 140° C. to stretch ratios as high as 4×4. Fiducial marks printed on the film before stretching indicated that the real stretch ratio in the bulk of the film specimen was higher than the nominal 4×4, averaging 4.25×4.25. The stretched film specimens were clear and colorless when viewed in transmission with normally incident light, and had no noticeable reflectivity.

The clear colorless appearance is indicative of a substantial match of refractive indices along all three principal directions for the PEN/PENBB20 multilayer film. The refractive indices of the PEN surface layers were measured as in the other Examples in this patent application. Since there are no exposed PENBB20 layers in this film, a simple two-layer film having PEN as one optically thick layer and PENBB20 as another optically thick layer. This film was prepared by placing together two monolayer films, one of PEN and one of PENBB, and stretching them together in the laboratory film stretcher at the same conditions used for the 151-layer film. The refractive indices of the PEN surface and the opposing PENBB20 surface were measured as in the other Examples in this patent application. PEN values were consistent within experimental error with those obtained on the multilayer film. PENBB values are shown in Table 10.

Example 26

PENBB15 and Monolayer Film One-Way Stretched

PENBB15 is the designation for a copolyester nominally having 85 mol % 2,6-naphthalate moieties and 15 mol % 4,4'-bibenzoate moieties, on an acids basis, and 100 mol % ethylene glycol moieties on a diols basis. PENBB15 resin was prepared as follows. To a room temperature stainless steel 2-gallon reactor kettle equipped with oil-jacketed heating, an overhead separation column, and a vacuum pump, the following were added:

8.0 lbs. of 2,6-naphthalene dicarboxylic acid (0.037 lbmols)

1.58 lbs. of biphenyldicarboxylic acid (0.007 lbmols)

6.08 lbs. of ethylene glycol (0.098 lbmols)

2.18 g of antimony triacetate (as a catalyst)

The reaction mixture was heated and stirred at 125 rpm under 40 psig of $N_2$. The temperature was raised over the course of about 1.5 hours to 260° C. By-product water was driven off and collected in the overheads receiver. The pressure in the kettle was then slowly reduced to atmosphere. After 5 more minutes of stirring a vacuum was applied to the kettle. After stirring at about 50 rpm for about 1.5 hours at a temp of about 280° C. under vacuum (pressure of 1-5 mmHg), the reaction mixture reached the target endpoint, as indicated by an agitator power draw known for this reaction kettle to correlate to the rheology of a PET having an IV of 0.60. The resulting polymer was drained from the kettle into trays. These bricks of polymer resin were allowed to cool and were later ground into small, relatively uniform granules.

The PENBB15 granules so obtained were fed at about 10 lbs/hr to a 25 mm Berstorff twin-screw extruder having a length/diameter ratio (1/d) of 40 (Krauss Maffei Corp.—Florence, Ky.). The extruder temperature was profiled from feed to exit, beginning at 200° C. and rising to 280° C. The extruder was connected by a series of two ½" necktubes and a gear pump to a feedblock and a 9" die, all kept at 280° C. The die was adjusted to cast a PENBB15 film of about 20 mils thickness, which was quenched on a 12" diameter chill roll and then wound into a stockroll.

The cast film was then stretched in a batch stretcher in the same manner as Example 23. The refractive indices were measured in the same manner as Example 23.

Example 27

PENBB10 and Monolayer Film One-Way Stretched

PENBB10 is the designation for a copolyester nominally having 90 mol % 2,6-naphthalate moieties and 10 mol % 4,4'-bibenzoate moieties, on an acids basis, and 100 mol % ethylene glycol moieties on a diols basis.

PENBB10 resin was prepared as follows. To a room temperature stainless steel 2-gallon reactor kettle equipped with oil-jacketed heating, an overhead separation column, and a vacuum pump, the following were added:

8.9 lbs. of dimethyl-2,6-naphthalene dicarboxylate (0.036 lbmols)

1.09 lbs. of biphenyldicarboxylic acid-methyl ester (0.004 lbmols)

5.35 lbs. of ethylene glycol (0.086 lbmols)

1.82 g of cobalt acetate (as a catalyst)

2.18 g of antimony triacetate (as a catalyst)

The reaction mixture was heated and stirred at 125 rpm under 40 psig of $N_2$. The temperature was raised over the course of about 1.5 hours to 260° C. By-product methanol was driven off and collected in the overheads receiver. The pressure in the kettle was then slowly reduced to atmosphere, and 1.82 g of triethyl phosphono acetate was added to the reactor. After 5 more minutes of stirring a vacuum was applied to the kettle. After stirring at about 50 rpm for about 1.5 hours at a temp of about 280° C. under vacuum (pressure of 1-5 mmHg), the reaction mixture reached the target endpoint, as indicated by an agitator power draw known for this reaction kettle to correlate to the rheology of a PET having an IV of 0.60. The resulting polymer was drained from the kettle into trays. These bricks of polymer resin were allowed to cool and were later ground into small, relatively uniform granules.

A monolayer film incorporating PENBB10 was extruded in the same manner as Example 26. The cast film was then stretched in a batch stretcher in the same manner as Example 23. The refractive indices were measured in the same manner as Example 23.

Example 28

PENBB5 and Monolayer Film One-Way Stretched

PENBB5 is the designation for a copolyester nominally having 95 mol % 2,6-naphthalate moieties and 5 mol % 4,4'-bibenzoate moieties, on an acids basis, and 100 mol % ethylene glycol moieties on a diols basis.

PENBB5 resin was prepared as follows. To a room temperature stainless steel 2-gallon reactor kettle equipped with oil-jacketed heating, an overhead separation column, and a vacuum pump, the following were added:

9.0 lbs. of dimethyl-2,6-naphthalene dicarboxylate (0.037 lbmols)

0.52 lbs. of biphenyldicarboxylic acid-methyl ester (0.002 lbmols)

5.13 lbs. of ethylene glycol (0.083 lbmols)

1.73 g of cobalt acetate (as a catalyst)

2.16 g of antimony triacetate (as a catalyst)

The reaction mixture was heated and stirred at 125 rpm under 20 psig of $N_2$. The temperature was raised over the course of about 1.5 hours to 260° C. By-product methanol was driven off and collected in the overheads receiver. The pressure in the kettle was then slowly reduced to atmosphere, and 1.73 g of triethyl phosphono acetate was added to the reactor. After 5 more minutes of stirring a vacuum was applied to the kettle. After stirring at about 50 rpm for about 1.5 hours at a temp of about 280° C. under vacuum (pressure of 1-5 mmHg), the reaction mixture reached the target endpoint, as indicated by an agitator power draw known for this reaction kettle to correlate to the rheology of a PET having an IV of 0.60. The resulting polymer was drained from the kettle into trays. These bricks of polymer resin were allowed to cool and were later ground into small, relatively uniform granules.

A monolayer film incorporating PENBB5 was extruded in the same manner as Example 26. The cast film was then stretched in a batch stretcher in the same manner as Example 23. The refractive indices were measured in the same manner as Example 23.

Example 29

PENBB25 and Monolayer Film One-Way Stretched

PENBB25 is the designation for a copolyester nominally having 75 mol % 2,6-naphthalate moieties and 25 mol % 4,4'-bibenzoate moieties, on an acids basis, and 100 mol % ethylene glycol moieties on a diols basis.

PENBB25 resin was prepared as follows. To a room temperature stainless steel 2-gallon reactor kettle equipped with oil-jacketed heating, an overhead separation column, and a vacuum pump, the following were added:

7.0 lbs. of 2,6-naphthalene dicarboxylic acid (0.037 lbmols)

2.61 lbs. of biphenyldicarboxylic acid (0.007 lbmols)

6.03 lbs. of ethylene glycol (0.098 lbmols)

2.18 g of antimony triacetate (as a catalyst)

The reaction mixture was heated and stirred at 125 rpm under 40 psig of $N_2$. The temperature was raised over the course of about 1.5 hours to 260° C. By-product water was driven off and collected in the overheads receiver. The pressure in the kettle was then slowly reduced to atmosphere. After 5 more minutes of stirring a vacuum was applied to the kettle. After stirring at about 50 rpm for about 1.5 hours at a temp of about 280° C. under vacuum (pressure of 1-5 mmHg), the reaction mixture reached the target endpoint, as indicated by an agitator power draw known for this reaction kettle to correlate to the rheology of a PET having an IV of 0.60. The resulting polymer was drained from the kettle into trays. These bricks of polymer resin were allowed to cool and were later ground into small, relatively uniform granules.

A monolayer film incorporating PENBB25 was extruded in the same manner as Example 26. The cast film was then stretched in a batch stretcher in the same manner as Example 23. The material was hazier and less uniform than PENBB20 though birefringent. The refractive indices were measured in the same manner as Example 23.

Example 29A

PENBB35 and Monolayer Film One-Way Stretched

PENBB35 is the designation for a copolyester nominally having 65 mol % 2,6-naphthalate moieties and 35 mol % 4,4'-bibenzoate moieties, on an acids basis, and 100 mol % ethylene glycol moieties on a diols basis.

This polymer was prepared, cast into film, and stretched, and the indices of the stretched film were measured, by procedures similar to those used for the other PENBB polymers in the Examples above. The film was hazy, and the indices did not show continued improvement in birefringence values or Ratio at this higher level of BB moieties.

Examples 23 to 29A and Comparative Example C14 were prepared as described above, and refractive indices (along with those for Comparative Example C5, for easy comparison) are summarized in Tables 10 and 11 along with haze values. The Examples show that PENBB can be biaxially stretched and that good results can be obtained with uniaxially stretched films. For the uniaxially stretched films, 5% BB loading in PENBB does relatively little to increase the birefringence ratio of $\Delta n_{xy}/\Delta n_{yz}$ for PENBB5 (2.8) as compared to PEN (2.4). But surprisingly when BB loading is within 10-25%, the ratio increased substantially to 4.1-7.8. At 35% BB loading for PENBB35, the birefringence ratio dropped back to 2.9 and causing a high haze value (>30% haze) in the finished film.

TABLE 10

| Ex. | Description | $n_i$ | $n_x$ | $n_y$ | $n_z$ | $\Delta n_{xy}$ | $\Delta n_{yz}$ | Ratio |
|---|---|---|---|---|---|---|---|---|
| 28 | PENBB5 | 1.640 | 1.861 | 1.613 | 1.525 | 0.248 | 0.088 | 2.8 |
| 27 | PENBB10 | 1.641 | 1.859 | 1.596 | 1.531 | 0.264 | 0.065 | 4.1 |
| 26 | PENBB15 | 1.641 | 1.852 | 1.591 | 1.539 | 0.260 | 0.053 | 4.9 |
| 23 | PENBB20 | 1.643 | 1.861 | 1.589 | 1.545 | 0.273 | 0.044 | 6.2 |
| 24 | PENBB20 | 1.643 | 1.721 | 1.749 | 1.507 | −0.049 | 0.270 | −0.18 |
| 25 | PENBB20 (Multilayer) | 1.643 | 1.734 | 1.780 | 1.498 | −0.046 | 0.282 | −0.16 |
| 29 | PENBB25 | 1.643 | 1.855 | 1.576 | 1.540 | 0.279 | 0.036 | 7.8 |
| 29A | PENBB35 | 1.643 | 1.863 | 1.601 | 1.511 | 0.262 | 0.090 | 2.9 |
| C5 | PEN | 1.640 | 1.854 | 1.614 | 1.513 | 0.240 | 0.101 | 2.4 |
| C14 | PEN | 1.640 | 1.721 | 1.749 | 1.515 | −0.029 | 0.234 | −0.12 |

TABLE 11

| Ex. | Description | Stretch Mode | Haze (%) |
|---|---|---|---|
| 23 | PENBB20 | uniaxial | 2-4 |
| 24 | PENBB20 | biaxial | 2-4 |
| 25 | PENBB20 (Multilayer) | biaxial | 1-2 |

TABLE 11-continued

| Ex. | Description | Stretch Mode | Haze (%) |
|---|---|---|---|
| 26 | PENBB15 | uniaxial | 1-3 |
| 27 | PENBB10 | uniaxial | 1-2 |
| 28 | PENBB5 | uniaxial | 4-6 |
| 29 | PENBB25 | uniaxial | 4-6 |
| 29A | PENBB35 | uniaxial | very high |
| C5 | PEN | uniaxial | 1-2 |
| C14 | PEN | biaxial | 1-2 |

Example 30

PENBB20 Multilayer Film at Industrial Scale

Film was prepared in a manner similar to Example 25; however, a 275 alternating layer feedblock was used. PEN extrudate temperatures were 282 C, PENBB20 extrudate temperature was 275 C, feedblock temperature was 285 C, and die temperature was 279 C. Mass flow ratio of the first PEN extruder, the PENBB20 extruder, and the second PEN extruder was 11:8:5. The 400 micron thick film was not wound into a stockroll but was instead fed to a conventional film-line Length Orienter. The film was preheated and stretched in the machine direction, at about 125 C, to a stretch ratio of about 3.8. The film was then led to a tenter oven, preheated to about 130 C, and stretched in the cross-direction to a stretch ratio of about 4.2. the finished film was about 25 microns thick, clear, and had a very slight gray hue. Refractive indices measured on the PEN surface layers in the x, y, and z directions, respectively, were 1.734, 1.752, and 1.497, which are consistent with other reported PEN indices in this application, and are consistent with a successfully sequentially biaxially oriented film.

This example shows that PENBB20 can be biaxially stretched using common sequential stretch process.

Various modifications and alterations of this invention will be apparent to those skilled in the art without departing from the scope and spirit of the invention, and it should be understood that this invention is not limited to the examples and embodiments described herein.

What is claimed is:

1. A multilayer optical film comprising:
alternating first and second optical layers,
the first optical layer comprising a first polyester derived from first carboxylate monomers and first diol monomers, wherein the first carboxylate monomers are selected from the group consisting of
i) about 55 mol % to about 75 mol % terephthalate and about 25 to about 45 mol % of 4,4'-biphenyl dicarboxylate; or
ii) about 75 to about 90 mol % napthalene dicarboxylate and about 10 to about 25 mol % of 4,4'-biphenyl dicarboxylate;
wherein the first optical layer has a ratio of $An_{xy}$ over $An_{yz}$ of at least 3; and
wherein the first and second optical layers have refractive indices along at least one axis that differ by at least 0.04.

2. The multilayer optical film of claim 1, the second optical layer comprising a second polyester.

3. The multilayer optical film of claim 1, wherein $\Delta n_{xy}$ for the first optical layer is at least about 0.18.

4. The multilayer optical film of claim 1, wherein the ratio of $\Delta n_{xy}$ over $\Delta n_{yz}$ for the first optical layer is at least about 8.

5. The multilayer optical film of claim 1, wherein the ratio of $\Delta n_{xy}$ over $\Delta n_{yz}$ for the first optical layer is at least about 15.

6. The multilayer optical film of claim 1 wherein the first diol monomers are aliphatic.

7. The multilayer optical film of claim 1, wherein the first carboxylate monomers are selected from group i) and the amount of 4,4'-biphenyl dicarboxylate is at least 35 mol %.

8. The multilayer optical film of claim 1, wherein the first carboxylate monomers are selected from group ii) and the amount of 4,4'-biphenyl dicarboxylate is at least 15 mol %.

9. A multilayer optical film comprising:
alternating first and second optical layers,
the first optical layer comprising a first polyester derived from first carboxylate monomers and first diol monomers, the first carboxylate monomers comprising from about 0.1 to about 5 mol % of a dicarboxylate monomer having pendant ionic groups wherein the first carboxylate monomers are selected from the group consisting of
i) about 55 mol % to about 75 mol % terephthalate and about 25 to about 45 mol % of 4,4'-biphenyl dicarboxylate; or
ii) about 75 to about 90 mol % napthalene dicarboxylate and about 10 to about 25 mol % of 4,4'-biphenyl dicarboxylate;
wherein the first and second optical layers have refractive indices along at least one axis that differ by at least 0.04.

10. The multilayer optical film of claim 9, the second optical layer comprising a second polyester.

* * * * *

UNITED STATES PATENT AND TRADEMARK OFFICE
CERTIFICATE OF CORRECTION

| | |
|---|---|
| PATENT NO. | : 9,477,011 B2 |
| APPLICATION NO. | : 13/638269 |
| DATED | : October 25, 2016 |
| INVENTOR(S) | : Liu et al. |

It is certified that error appears in the above-identified patent and that said Letters Patent is hereby corrected as shown below:

In the Specification

Column 3

Line 28, Delete "napthalene" and insert -- naphthalene --, therefor.

Line 30, Delete "napthalene" and insert -- naphthalene --, therefor.

Column 8

Line 36, Delete "dicaroxylate" and insert -- dicarboxylate --, therefor.

Line 40, Delete "dicaroxylate" and insert -- dicarboxylate --, therefor.

Line 47, Delete "dicaroxylate" and insert -- dicarboxylate --, therefor.

Line 56, Delete "dicaroxylate" and insert -- dicarboxylate --, therefor.

Line 62, Delete "dicaroxylate" and insert -- dicarboxylate --, therefor.

Column 9

Line 1, Delete "dicaroxylate" and insert -- dicarboxylate --, therefor.

Column 10

Line 37, Delete "terephthate" and insert -- terephthalate --, therefor.

Signed and Sealed this
Twenty-fifth Day of April, 2017

Michelle K. Lee
*Director of the United States Patent and Trademark Office*

CERTIFICATE OF CORRECTION (continued)
U.S. Pat. No. 9,477,011 B2

Column 13

Line 27, Delete "2,6-napthalenedicarboxylate" and insert -- 2,6-naphthalenedicarboxylate --, therefor.

Column 14

Line 30, Delete "(1/d)" and insert -- (l/d) --, therefor.

Column 15

Line 19, Delete "(1/d)" and insert -- (l/d) --, therefor.

Column 16

Line 39, Delete "(1/d)" and insert -- (l/d) --, therefor.

Column 22

Line 13, Delete "(1/d)" and insert -- (l/d) --, therefor.

Line 65, Delete "(1/d)" and insert -- (l/d) --, therefor.

Column 24

Line 21, Delete "(1/d)" and insert -- (l/d) --, therefor.

Column 25

Line 42, Delete "(lid)" and insert -- (l/d) --, therefor.

Column 26

Line 36, Delete "(1/d)" and insert -- (l/d) --, therefor.

Column 27

Line 31, Delete "(1/d)" and insert -- (l/d) --, therefor.

Column 28

Line 28, Delete "(1/d)" and insert -- (l/d) --, therefor.

Line 35, After "stockroll" insert -- . --.

Line 65, Delete "(1/d)" and insert -- (l/d) --, therefor.

Column 29

Line 5, After "stockroll" insert -- . --.

Line 35, Delete "(1/d)" and insert -- (l/d) --, therefor.

Column 30

Line 15, Delete "(1/d)" and insert -- (l/d) --, therefor.

Line 22, After "stockroll" insert -- . --.

Column 31

Line 57, Delete "(1/d)" and insert -- (l/d) --, therefor.

Column 34

Line 14, Delete "(1/d)" and insert -- (l/d) --, therefor.

In the Claims

Column 38

Line 1, Claim 1, delete "napthalene" and insert -- naphthalene --, therefor.

Line 41, Claim 9, delete "napthalene" and insert -- naphthalene --, therefor.